United States Patent
Anticuar et al.

(10) Patent No.: US 10,266,074 B2
(45) Date of Patent: *Apr. 23, 2019

(54) SEAT-TRACK ASSEMBLY

(71) Applicant: FISHER & COMPANY, INCORPORATED, St. Clair Shores, MI (US)

(72) Inventors: David G. Anticuar, West Bloomfield, MI (US); Andrew Joshua Simms, Royal Oak, MI (US); Karl Sponsler, Canton, MI (US); Seth Kirkendall, Dearborn, MI (US); Sapan Mahendra Poptani, Farmington Hills, MI (US)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 152 days.

This patent is subject to a terminal disclaimer.

(21) Appl. No.: 14/886,392

(22) Filed: Oct. 19, 2015

(65) Prior Publication Data

US 2016/0039314 A1 Feb. 11, 2016

Related U.S. Application Data

(63) Continuation-in-part of application No. 14/349,817, filed as application No. PCT/US2012/060605 on Oct. 17, 2012, now Pat. No. 9,205,763.
(Continued)

(51) Int. Cl.
*B60N 2/08* (2006.01)

(52) U.S. Cl.
CPC ......... *B60N 2/0893* (2013.01); *B60N 2/0806* (2013.01); *B60N 2/0818* (2013.01); *B60N 2/0875* (2013.01)

(58) Field of Classification Search
CPC .. B60N 2/0806; B60N 2/0812; B60N 2/0818; B60N 2/0831; B60N 2/0862;
(Continued)

(56) References Cited

U.S. PATENT DOCUMENTS

| 5,913,947 A | 6/1999 | Groche |
| 6,113,051 A | 9/2000 | Moradell et al. |

(Continued)

FOREIGN PATENT DOCUMENTS

| DE | 102004056430 B3 | 9/2005 |
| DE | 102004051694 A1 | 4/2006 |

(Continued)

OTHER PUBLICATIONS

Extended European Search Report regarding Application No. 12842267.2, dated Mar. 16, 2015.
(Continued)

*Primary Examiner* — Jonathan Liu
*Assistant Examiner* — Guang H Guan
(74) *Attorney, Agent, or Firm* — Harness, Dickey & Pierce, P.L.C.

(57) ABSTRACT

A seat-track assembly is provided and may include a first track member having a series of locking features and a second track member slidably supported by the first track member. The seat-track assembly may also include a locking mechanism having locking pawls movable between a locked state engaged with the locking features to restrict relative movement between the first and second track members and an unlocked state disengaged from the locking features to permit relative movement between the first and second track members. The locking pawls may each include locking elements that are received within respective ones of the series of locking features in the locked state such that the locking elements restrict relative movement between the
(Continued)

first track member and the second track member in two directions when the locking pawls are in the locked state.

10 Claims, 23 Drawing Sheets

Related U.S. Application Data

(60) Provisional application No. 61/548,042, filed on Oct. 17, 2011.

(58) Field of Classification Search
CPC .. B60N 2/0875; B60N 2/0881; B60N 2/0887; B60N 2/0893
USPC ........................ 248/419, 420, 424, 429, 430; 296/65.13–65.15; 297/344.1, 344.11
See application file for complete search history.

(56) References Cited

U.S. PATENT DOCUMENTS

| | | | |
|---|---|---|---|
| 6,322,036 B1 | 11/2001 | Tame et al. | |
| 6,354,553 B1 | 3/2002 | Lagerweij et al. | |
| 6,637,712 B1 | 10/2003 | Lagerweij | |
| 6,648,292 B2 | 11/2003 | Flick et al. | |
| 6,843,532 B2 | 1/2005 | Borbe et al. | |
| 6,892,995 B2 | 5/2005 | Tame et al. | |
| 7,000,880 B2 | 2/2006 | Jaudouin | |
| 7,066,521 B2 * | 6/2006 | Jung .................... | B60N 2/0705 248/430 |
| 7,293,752 B2 | 11/2007 | McCulloch et al. | |
| 7,780,138 B1 | 8/2010 | Lee et al. | |
| 7,980,525 B2 * | 7/2011 | Kostin ................. | B60N 2/0806 248/429 |
| 8,029,063 B2 | 10/2011 | Kazyak et al. | |
| 8,215,602 B2 | 7/2012 | Walter et al. | |
| 8,376,460 B2 | 2/2013 | Nadgouda et al. | |
| 8,870,147 B2 * | 10/2014 | Simms ................. | B60N 2/0818 248/419 |
| 9,067,514 B2 * | 6/2015 | Oh ....................... | B60N 2/0705 |
| 9,205,763 B2 | 12/2015 | Anticuar et al. | |
| 9,481,266 B2 * | 11/2016 | Kim ..................... | B60N 2/0705 |
| 2005/0205746 A1 * | 9/2005 | Jung .................... | B60N 2/0875 248/429 |
| 2006/0131470 A1 | 6/2006 | Yamada et al. | |
| 2009/0051208 A1 | 2/2009 | Szybisty et al. | |
| 2009/0230275 A1 | 9/2009 | Lawall et al. | |
| 2011/0012005 A1 | 1/2011 | Jahner et al. | |
| 2012/0298828 A1 | 11/2012 | Wakayama et al. | |
| 2013/0112833 A1 | 5/2013 | Kim | |
| 2013/0264453 A1 | 10/2013 | Dill et al. | |
| 2014/0224954 A1 * | 8/2014 | Oh ....................... | B60N 2/0705 248/429 |
| 2014/0263920 A1 * | 9/2014 | Anticuar .............. | B60N 2/0705 248/429 |
| 2016/0039314 A1 * | 2/2016 | Anticuar .............. | B60N 2/0806 248/429 |
| 2016/0046208 A1 * | 2/2016 | Anticuar .............. | B60N 2/0705 248/429 |

FOREIGN PATENT DOCUMENTS

| | | | | |
|---|---|---|---|---|
| DE | 102006009265 A1 | 8/2006 | | |
| DE | 102006039505 A1 | 2/2008 | | |
| DE | 102008025274 A1 * | 12/2009 | ........... | B60N 2/0705 |
| DE | 102008056683 A1 | 5/2010 | | |
| DE | 102011100762 A1 | 11/2012 | | |
| EP | 1671836 A2 | 6/2006 | | |
| EP | 1621391 B1 | 11/2010 | | |
| JP | H07251658 A | 10/1995 | | |
| JP | 2006117229 | 5/2006 | | |
| JP | 2007126080 A | 5/2007 | | |
| JP | 2008080905 A | 4/2008 | | |
| KR | 20020055670 A | 7/2002 | | |
| KR | 20090131069 A | 12/2009 | | |
| KR | 20130092176 A | 8/2013 | | |
| KR | 20130092177 A | 8/2013 | | |
| WO | 2013/059312 A1 | 4/2013 | | |

OTHER PUBLICATIONS

Final Office Action in U.S. Appl. No. 13/166,160, dated Jul. 24, 2013.
International Preliminary Report on Patentability regarding International Application No. PCT/US2012/060605, dated Apr. 22, 2014.
Non-Final Office Action in U.S. Appl. No. 13/166,160, dated Mar. 13, 2013.
Non-Final Office Action in U.S. Appl. No. 13/166,160, dated Nov. 6, 2013.
Notice of Allowance regarding U.S. Appl. No. 14/349,817, dated Sep. 1, 2015.
International Search Report and Written Opinion of the International Searching Authority regarding International Application No. PCT/US2012/060605, dated Mar. 29, 2013.
Office Action regarding German Patent Application No. 102016119490.5, dated Apr. 16, 2018. Partial translation provided by Witte, Weller, and Partner.

* cited by examiner

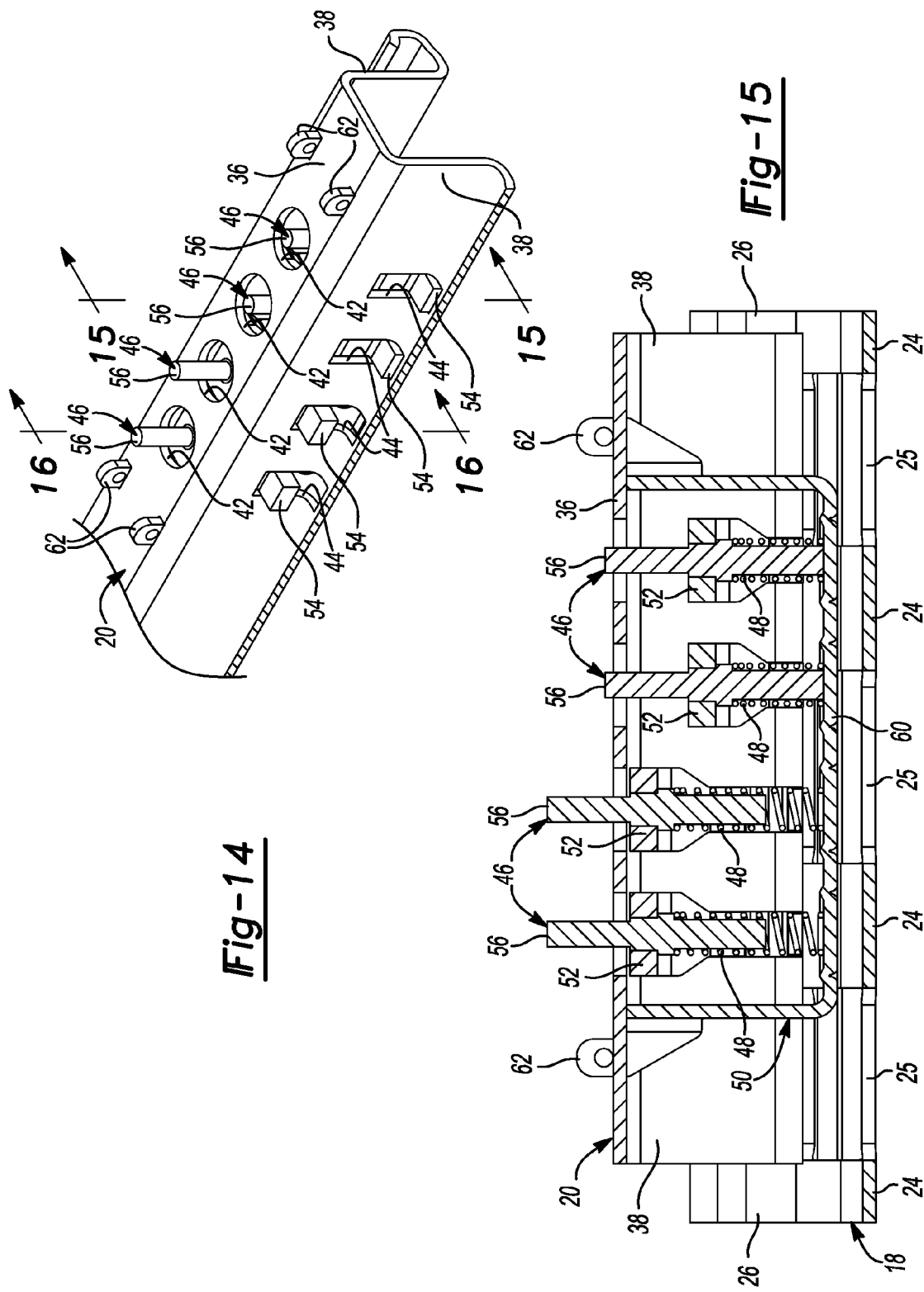

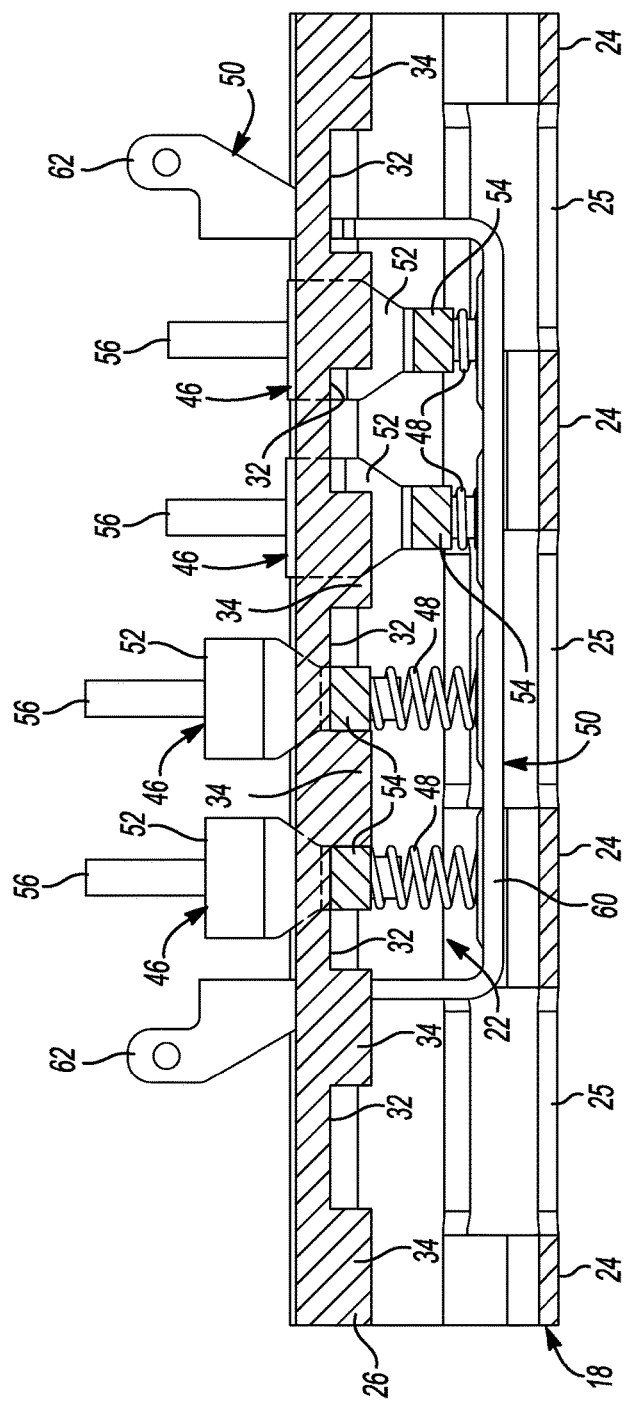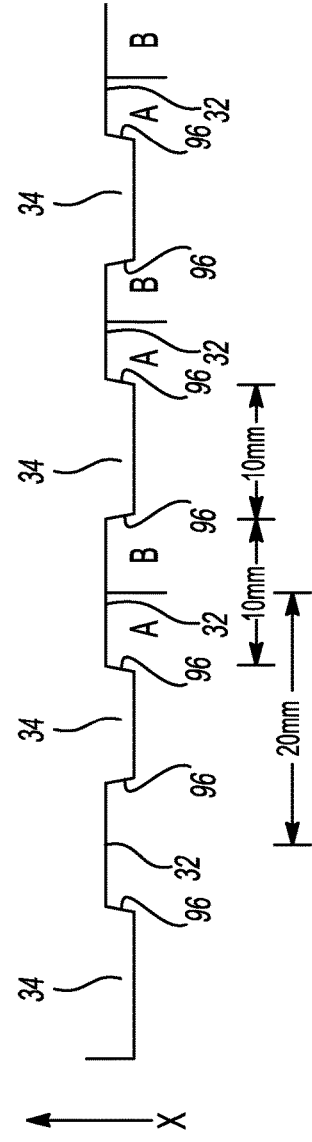

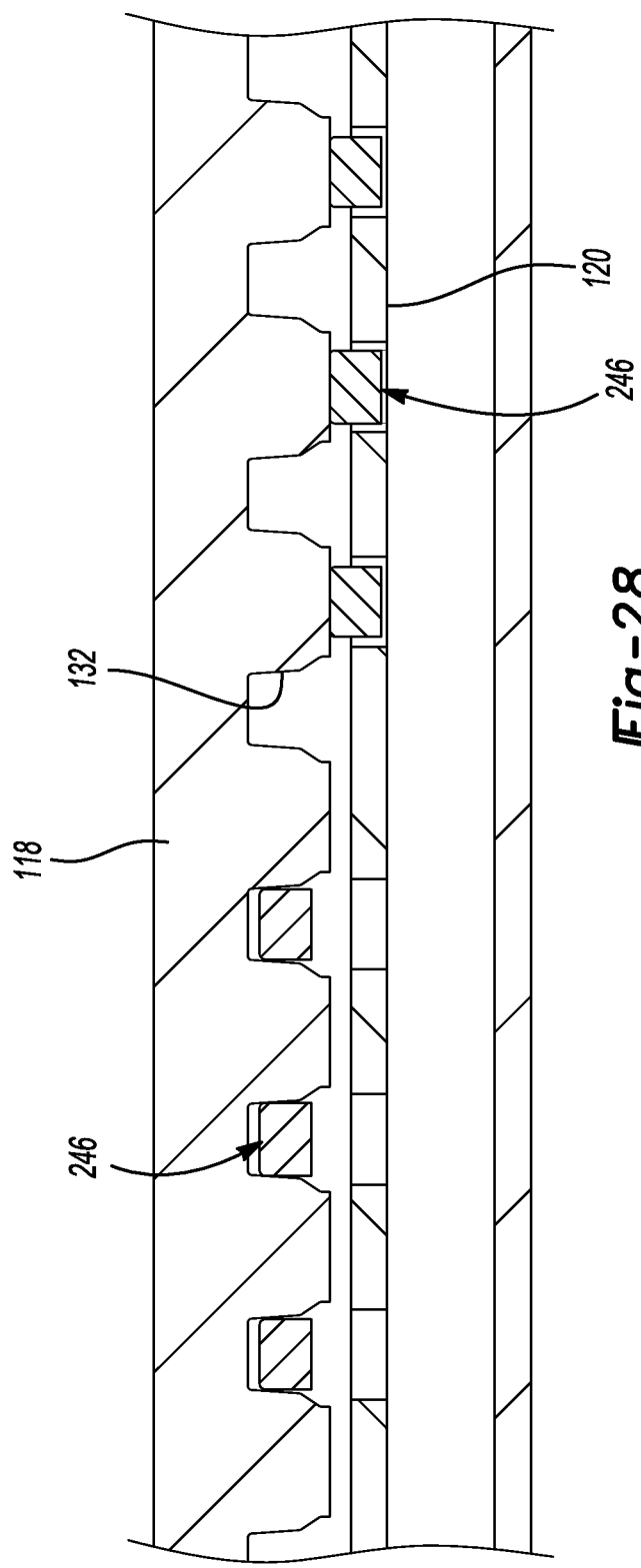

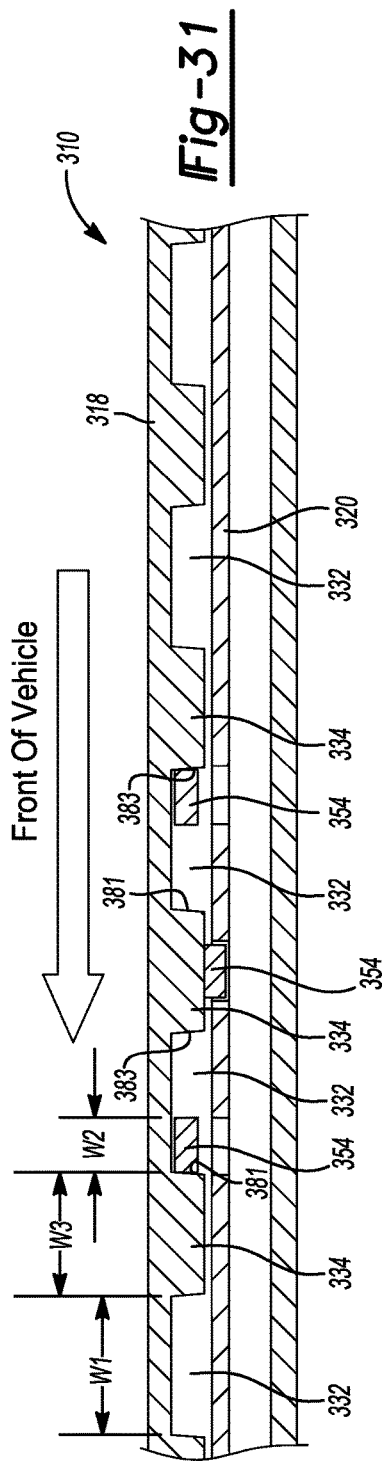
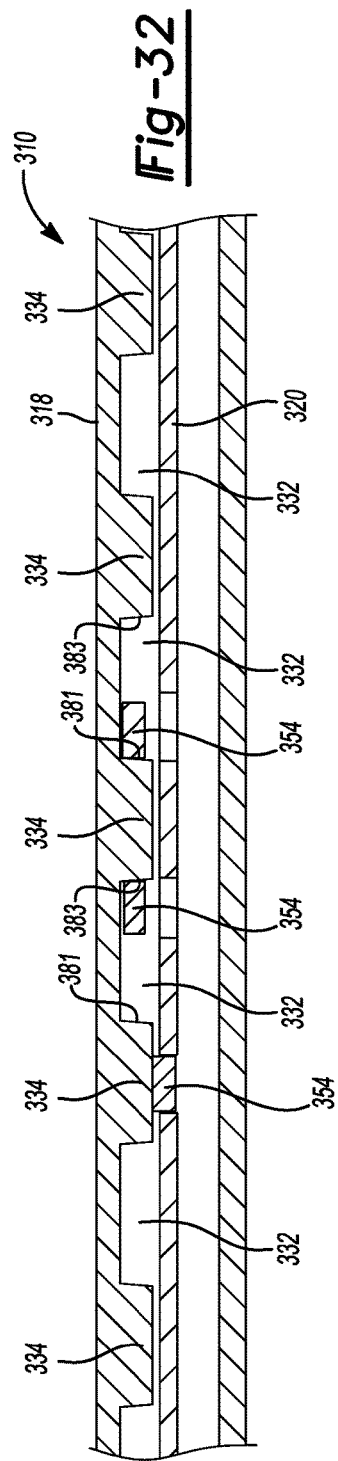
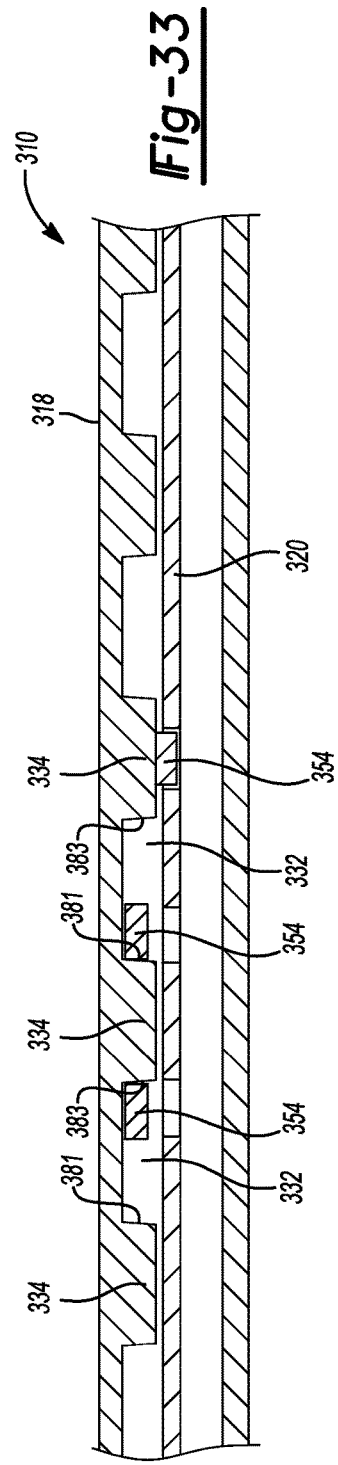

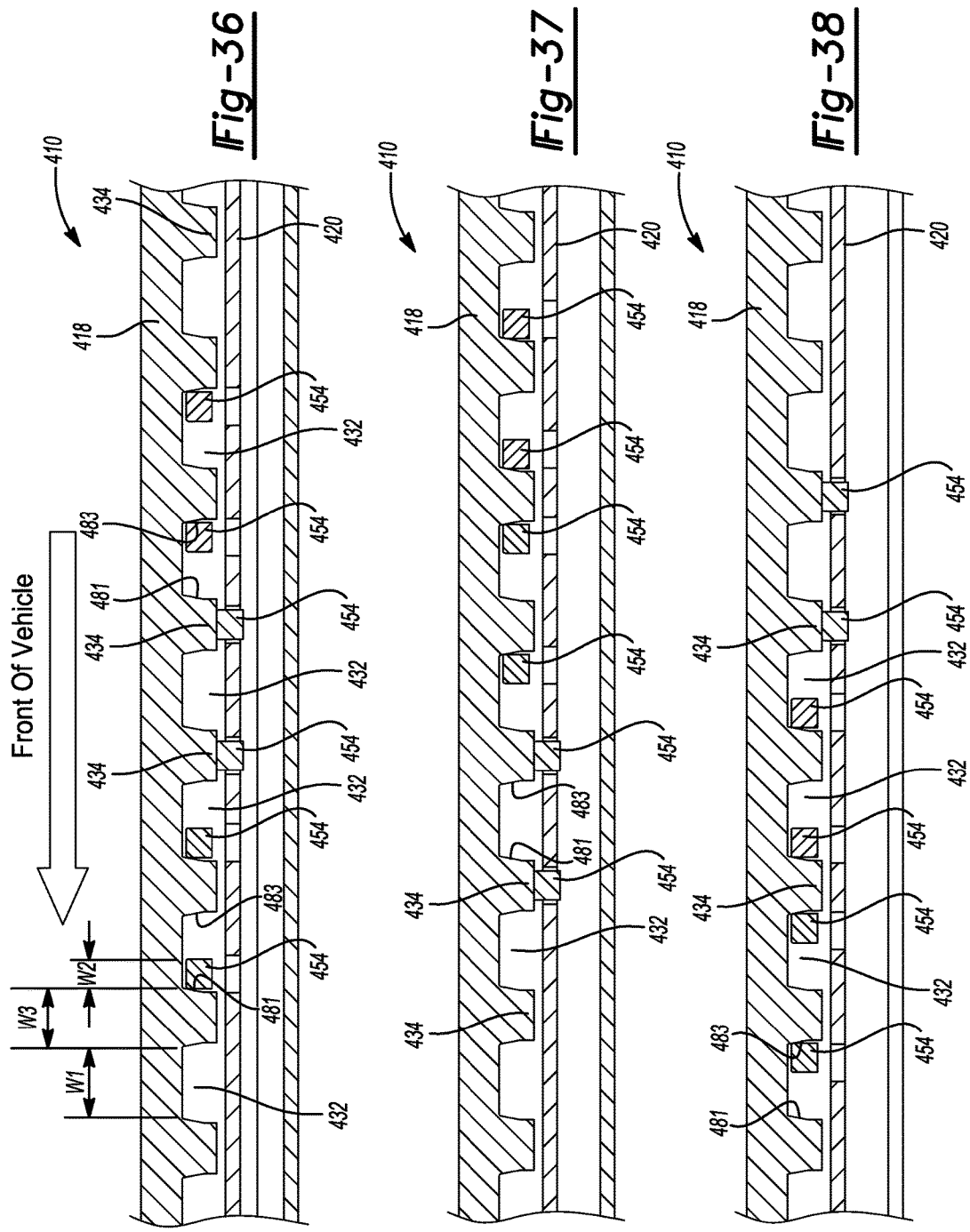

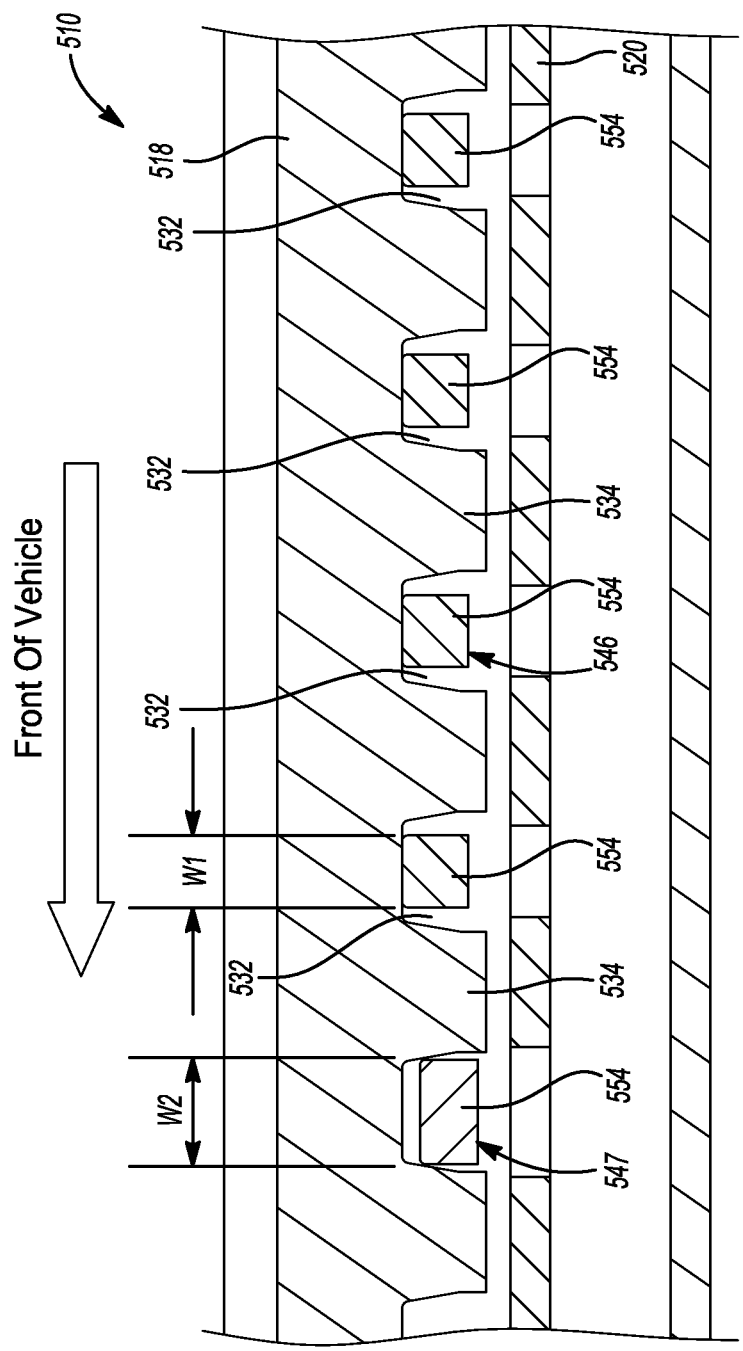

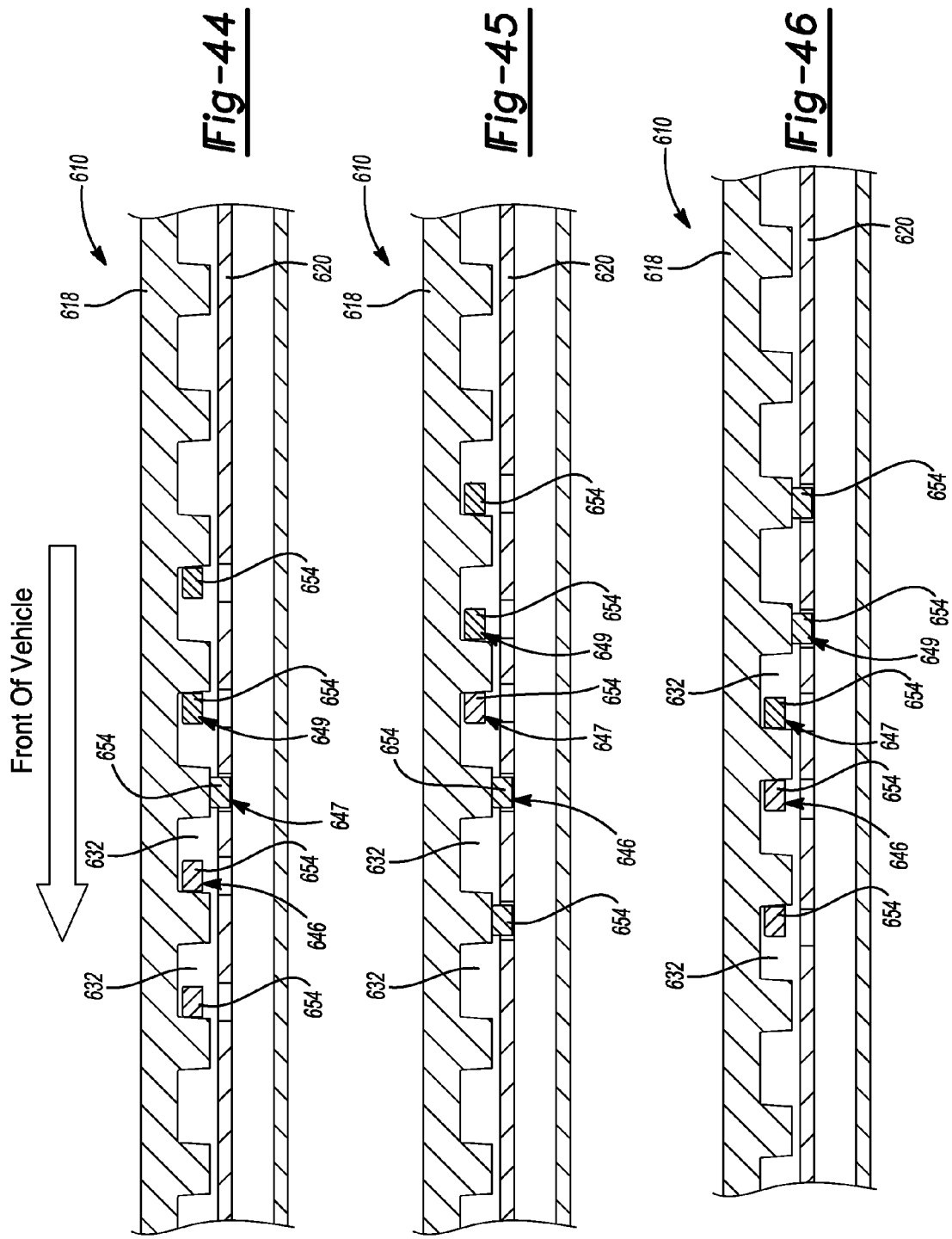

SEAT-TRACK ASSEMBLY

CROSS-REFERENCE TO RELATED APPLICATIONS

This application is a continuation-in-part of U.S. application Ser. No. 14/349,817, filed on Apr. 4, 2014, which is a National Stage of International Application No. PCT/US2012/060605, filed Oct. 17, 2012, which claims the benefit of U.S. Provisional Application No. 61/548,042, filed on Oct. 17, 2011. The entire disclosures of the above applications are incorporated herein by reference.

FIELD

The present disclosure relates to seat-track assemblies and more particularly to a locking mechanism for a seat-track assembly.

BACKGROUND

This section provides background information related to the present disclosure and is not necessarily prior art.

Modern vehicles typically include at least one seat assembly that is movable in a fore-aft direction relative to a floorpan of a vehicle. For example, a sport utility vehicle or minivan may incorporate a driver-seat assembly, a passenger-seat assembly, and a second-row seat assembly that are all movable in a fore-aft direction relative to the floorpan of the vehicle. Movement of the foregoing seat assemblies permits a user to adjust a position of the respective seat assembly relative to vehicle controls and/or to permit access to an area generally behind the seat assembly. For example, adjustment of a driver-seat assembly relative to a floorpan of a vehicle permits the driver to move the seat assembly closer to or farther away from a steering wheel of the vehicle. Likewise, permitting adjustment of a passenger-seat assembly in a fore-aft direction relative to a floorpan of a vehicle permits a user to adjust a position of the passenger seat relative to controls of the vehicle and/or to access an area behind the passenger seat to gain access to a second-row seat assembly or to gain access to a storage compartment of the vehicle.

Seat assemblies that are permitted to move in a fore-aft direction relative to a floorpan of a vehicle typically include a seat-track assembly that provides for such movement. Such seat-track assemblies typically include a first component that is fixed to a floorpan of a vehicle and a second component that is fixed for movement with a vehicle seat. The second component is selectively movable relative to the first component and, thus, permits selective movement of the seat assembly relative to the first component. Permitting movement of the second component and seat assembly relative to the first component likewise permits movement of the seat assembly and second component relative to the floorpan of the vehicle.

While conventional seat assemblies incorporate a seat-track assembly that permits for selective adjustment of a vehicle seat in a fore-aft direction relative to a floorpan of a vehicle, such seat-track assemblies do not provide an occupant with the ability to adjust a position of the seat assembly relative to the floorpan in small increments. Further, conventional seat assemblies typically require a user to move the seat assembly greater than five millimeters (5 mm) in either the fore or aft direction following release of an actuation mechanism to allow a locking mechanism associated with the seat-track assembly to properly engage and fix a position of the seat assembly relative to the floorpan. Finally, while conventional seat-track assemblies adequately fix a position of a seat assembly relative to a floorpan of a vehicle, such seat-track assemblies may experience a degree of rattling or "chucking" during use caused by relative movement between the various components of the seat-track assembly, thereby creating undesirable noise during use.

SUMMARY

This section provides a general summary of the disclosure, and is not a comprehensive disclosure of its full scope or all of its features.

In one form, the present disclosure provides a seat-track assembly that may include a first track member having a series of locking features and a second track member slidably supported by the first track member. A locking mechanism may be disposed at least partially between the first track member and the second track member and may include at least two locking pawls movable between a locked state engaged with the locking features to restrict relative movement between the first track member and the second track member and an unlocked state disengaged from the locking features to permit relative movement between the first track member and the second track member. The at least two locking pawls may each include at least two locking elements that are received within respective ones of the series of locking features in the locked state such that each of the locking elements simultaneously restrict relative movement between the first track member and the second track member in two directions when the locking pawls are in the locked state.

In another form, the present disclosure provides a seat-track assembly that may seat-track assembly is provided and may include a first track member having a series of locking features and a second track member slidably supported by the first track member. A locking mechanism may be disposed at least partially between the first track member and the second track member and may include at least two locking pawls movable between a locked state engaged with the locking features to restrict relative movement between the first track member and the second track member and an unlocked state disengaged from the locking features to permit relative movement between the first track member and the second track member. The at least two locking pawls may each include at least two locking elements that are in contact with the first track member at two locations within each of the locking features when in the locked state.

In another form, the present disclosure provides a seat-track assembly that may include first and second track members and a locking mechanism. The first track member may include a series of locking features. The second track member may be slidably supported by the first track member. The locking mechanism may be disposed at least partially between the first track member and the second track member and may include first, second and third locking pawls that are movable independently of each other between a locked state engaged with the locking features to restrict relative movement between the first track member and the second track member and an unlocked state disengaged from the locking features to permit relative movement between the first track member and the second track member. Each of the first, second and third locking pawls may include a locking element that is received within a respective one of the series of locking features in the locked state. The locking features may each have a width that is at least double a width of each of the locking elements such that the locking elements of two of the first, second and third locking pawls simultaneously restrict relative movement between the first track member and the second track member in two directions when the two of the locking pawls are in the locked state. At least one of the locking pawls may be in the unlocked state at any given time.

In some configurations, a plurality of locking elements extend from opposite ends of each of the locking pawls and are received within respective locking features when the locking pawls are in the locked state.

In some configurations, only a single locking element extends from each end of each of the locking pawls.

In some configurations, the seat-track includes an actuator operable to selectively apply a force on any two of the first, second and third locking pawls to maintain the two of the locking pawls in the unlocked state.

In some configurations, at least one of the locking pawls is in the locked state following release of the force regardless of the positioning of the second track member relative to the first track member.

In some configurations, relative movement between the first track member and the second track member is limited to half of the width of one of the locking features following release of the force before the locking elements of two of the locking pawls are received within respective ones of the locking features.

In some configurations, the actuator includes an elongated bar extending parallel to longitudinal axes of the first and second track members, and the elongated bar includes a peg extending perpendicular to the longitudinal axes and through an aperture in the second track member.

In some configurations, the elongated bar selectively applies a force on the locking pawls to maintain the locking pawls in the unlocked state.

In some configurations, the seat-track assembly includes a housing attached to the second track member and disposed between the first and second track members. The housing may define a cavity in which the elongated bar is movably disposed. Each of the locking pawls may include an actuation arm that extends into the cavity and reciprocates therein as the locking pawls move between the locked and unlocked states.

In another form, the present disclosure provides a seat-track assembly that may include first and second track members and a locking mechanism. The first track member may include a series of locking features. The second track member may be slidably supported by the first track member. The locking mechanism may be disposed at least partially between the first track member and the second track member and including first and second locking pawls that are movable independently of each other between a locked state engaged with the locking features to restrict relative movement between the first track member and the second track member and an unlocked state disengaged from the locking features to permit relative movement between the first track member and the second track member. Each of the locking pawls may include locking elements that are received within a respective one of the series of locking features in the locked state. The first locking pawl may include a plurality of locking elements extending from opposite ends of the first locking pawl. The second locking pawl may include only a single locking element extending from each end of the second locking pawl.

In some configurations, the locking features each have a width that is greater than a width of one of the locking elements of the first locking pawl and substantially equal to a width of one of the locking elements of the second locking pawl.

In some configurations, the seat-track assembly includes a third locking pawl movable independently of the first and second locking pawls between the locked and unlocked states.

In some configurations, the second locking pawl is disposed between the first and third locking pawls.

In some configurations, the seat-track assembly includes an actuator operable to selectively apply a force on any two of the first, second and third locking pawls to maintain the two of the locking pawls in the unlocked state.

In some configurations, at least one of the locking pawls is in the locked state following release of the force regardless of the positioning of the second track member relative to the first track member.

In some configurations, relative movement between the first track member and the second track member is limited to half of the width of one of the locking features following release of the force before the locking elements of two of the locking pawls are received within respective ones of the locking features.

In some configurations, the seat-track assembly includes an actuator operable to selectively apply a force on the locking pawls to maintain the locking pawls in the unlocked state.

In some configurations, the actuator includes an elongated bar extending parallel to longitudinal axes of the first and second track members. The elongated bar may include a peg extending perpendicular to the longitudinal axes and through an aperture in the second track member.

In some configurations, the seat-track assembly includes a housing attached to the second track member and disposed between the first and second track members. The housing may define a cavity in which the elongated bar is movably disposed.

In some configurations, each of the locking pawls includes an actuation arm that extends into the cavity and reciprocates therein as the locking pawls move between the locked and unlocked states.

In some configurations, the first track member and the second track member are movable in two, opposite directions relative to one another along an axis when the locking mechanism is in the unlocked state Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 14 is a partial perspective view of the track assembly of FIG. 2 showing two locking pawls in a raised and locked state;

FIG. 15 is a cross-sectional view of the track assembly of FIG. 14 taken along line 15-15;

FIG. 16 is a cross-sectional view of the track assembly of FIG. 14 taken along line 16-16;

FIG. 17 is a schematic representation of a portion of a track of the track assembly of FIG. 2 illustrating locking features;

FIG. 28 is a cross-sectional view of a portion of a track of the seat-track assembly of FIG. 27 illustrating locking features;

FIG. 31 is a cross-sectional view of a portion of a track of the seat-track assembly of FIG. 30 in a first position;

FIG. 32 is a cross-sectional view of a portion of the track in a second position;

FIG. 33 is a cross-sectional view of a portion of the track in a third position;

FIG. 36 is a cross-sectional view of a portion of a track of the seat-track assembly of FIG. 35 in a first position;

FIG. 37 is a cross-sectional view of a portion of the track in a second position;

FIG. 38 is a cross-sectional view of a portion of the track in a third position;

FIG. 41 is a cross-sectional view of a portion of a track of the seat-track assembly of FIG. 40 illustrating locking features;

FIG. 44 is a cross-sectional view of a portion of a track of the seat-track assembly of FIG. 43 in a first position;

FIG. 45 is a cross-sectional view of a portion of the track in a second position; and FIG. 46 is a cross-sectional view of a portion of the track in a third position.

Corresponding reference numerals indicate corresponding parts throughout the several views of the drawings.

DETAILED DESCRIPTION

Figure 1:
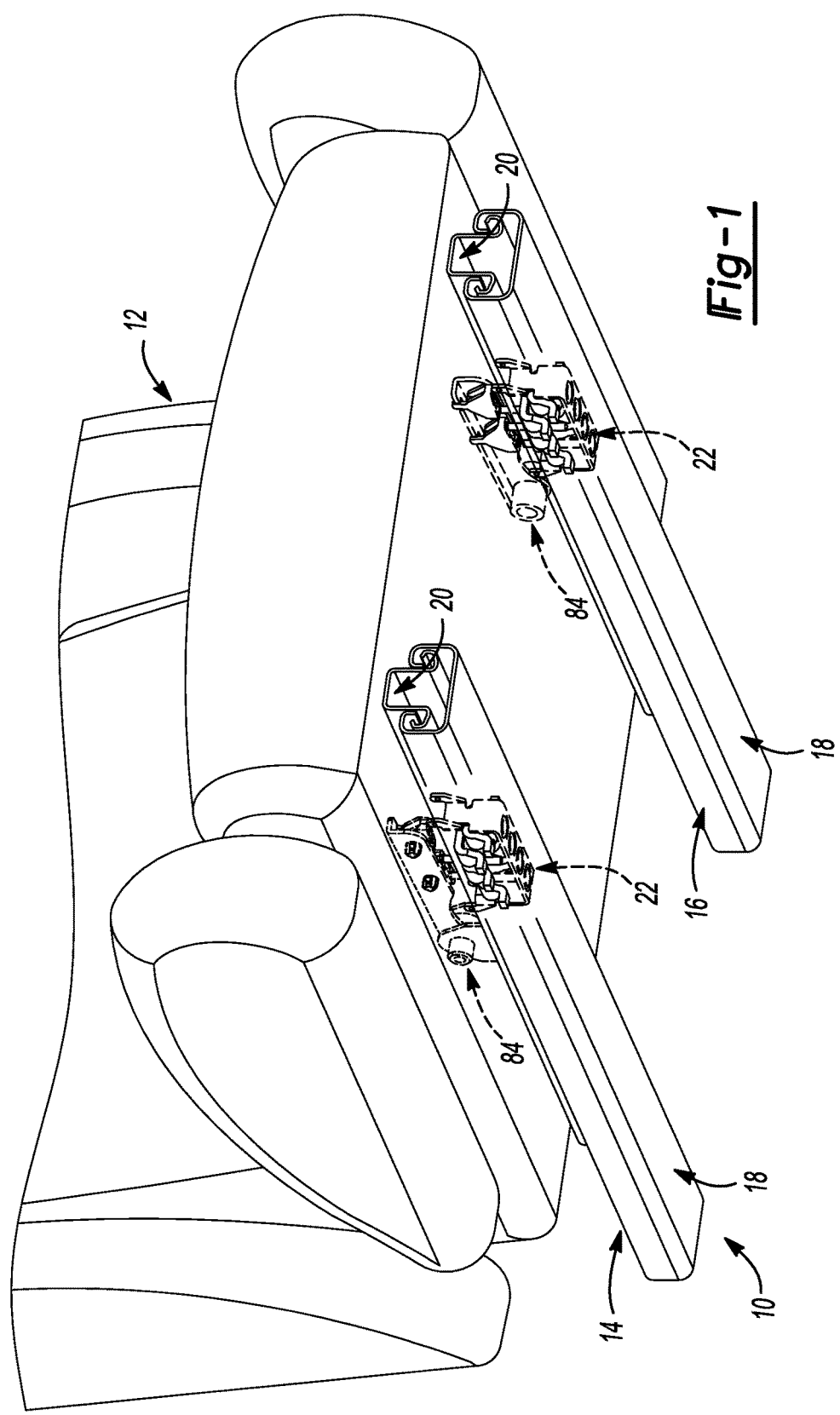
FIG. 1 is a partial perspective view of a seat assembly incorporating a seat-track assembly in accordance with the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
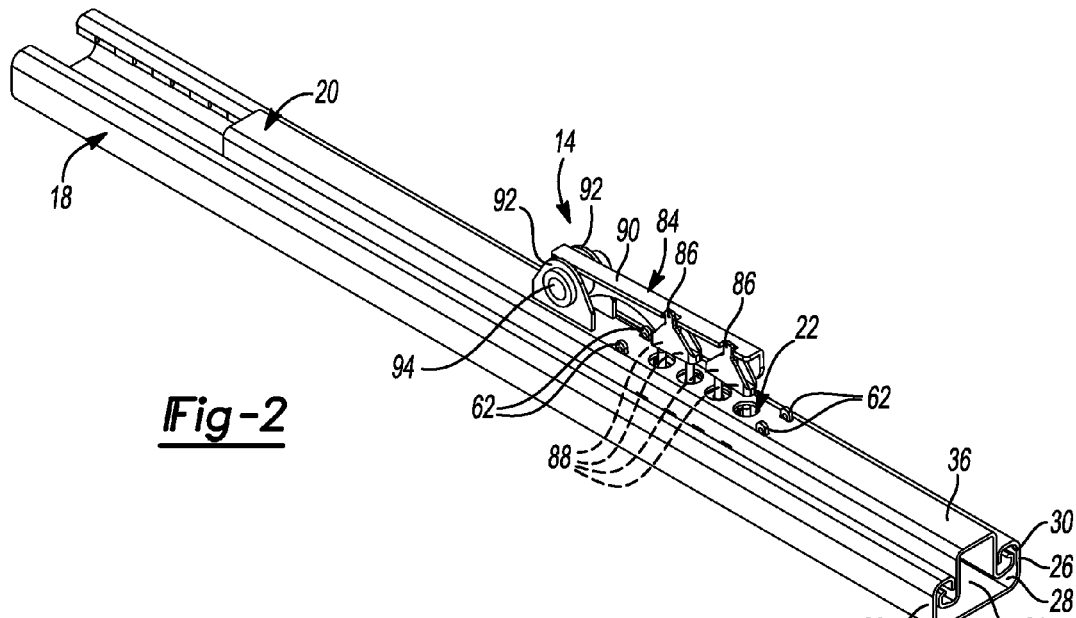
FIG. 2 is a perspective view of a track assembly of the seat-track assembly of FIG. 1.

With particular reference to FIGS. 1 and 2, a seat-track assembly 10 for use with a seat assembly 12 is provided. The seat-track assembly 10 may include a first track assembly 14 and a second track assembly 16 that cooperate to selectively permit fore and aft adjustment of the seat assembly 12 relative to an external structure such as, for example, a floorpan of a vehicle (neither shown). The first track assembly 14 and the second track assembly 16 may be identical in both structure and function. Accordingly, only the first track assembly 14 will be described and shown in detail.

The first track assembly 14 may include a lower track 18 fixedly attached to a floorpan of a vehicle (neither shown), an upper track 20 slidably supported by the lower track 18 relative to the floorpan, and a locking mechanism 22 at least partially disposed between the lower track 18 and the upper track 20. In operation, the locking mechanism 22 may selectively fix a position of the upper track 20 relative to the lower track 18 when in a locked state and may permit movement of the upper track 20 relative to the lower track 18 when in an unlocked state.

The lower track 18 may be attached to the floorpan via a suitable process such as, for example, welding and/or staking. The lower track 18 may include a bottom wall 24 and a pair of sidewalls 26 that extend generally from the bottom wall 24. The bottom wall 24 may include a series of openings 25 and may be integrally formed with the sidewalls 26. As such, the bottom wall 24 may cooperate with the sidewalls 26 to form a channel 28 extending substantially along a length of the lower track 18. The sidewalls 26 may also include a channel 30 extending along a length of each sidewall 26 and may include a series of locking features 32 separated by a series of projections 34.

The locking features 32 may each include a width substantially equal to 10 mm, for example, such that center portions of adjacent locking features 32 are separated by approximately 20 mm (FIG. 17). As shown in FIG. 17, adjacent locking features 32 are separated from one another by a projection 34, which likewise may include a width substantially equal to 10 mm. As will be described in greater detail below, each locking feature 32 may be separated into a first half (A) and a second half (B) to respectively receive and position a portion of the locking mechanism 22 therein to selectively prevent movement of the upper track 20 relative to the lower track 18.

As described above, the lower track 18 slidably receives the upper track 20 to permit selective movement of the upper track 20 relative to the lower track 18. Such movement may be facilitated by a ball-cage assembly (not shown) that may be at least partially received within the channels 30 of the sidewalls 26. The ball-cage assembly may include a housing and a series of ball bearings (neither shown). The ball bearings are constrained by the housing but are permitted to rotate relative thereto. Such rotation of the ball bearings relative to the housing facilitates movement of the upper track 20 relative to the lower track 18 when the locking mechanism 22 is in the unlocked state.

Figure 4:
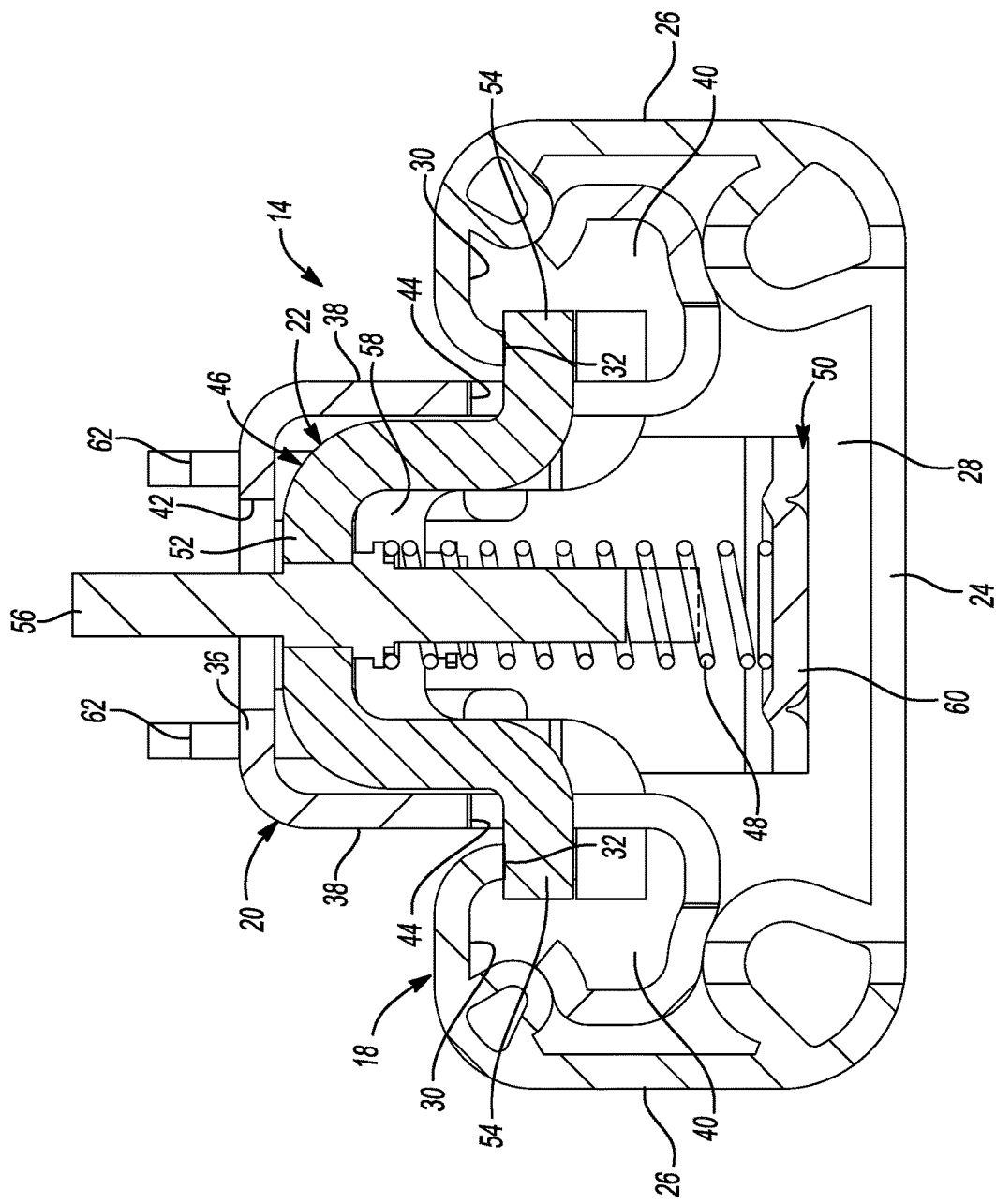
FIG. 4 is a cross-sectional view of the track assembly of FIG. 3 taken along line 4-4.
Figure 5:
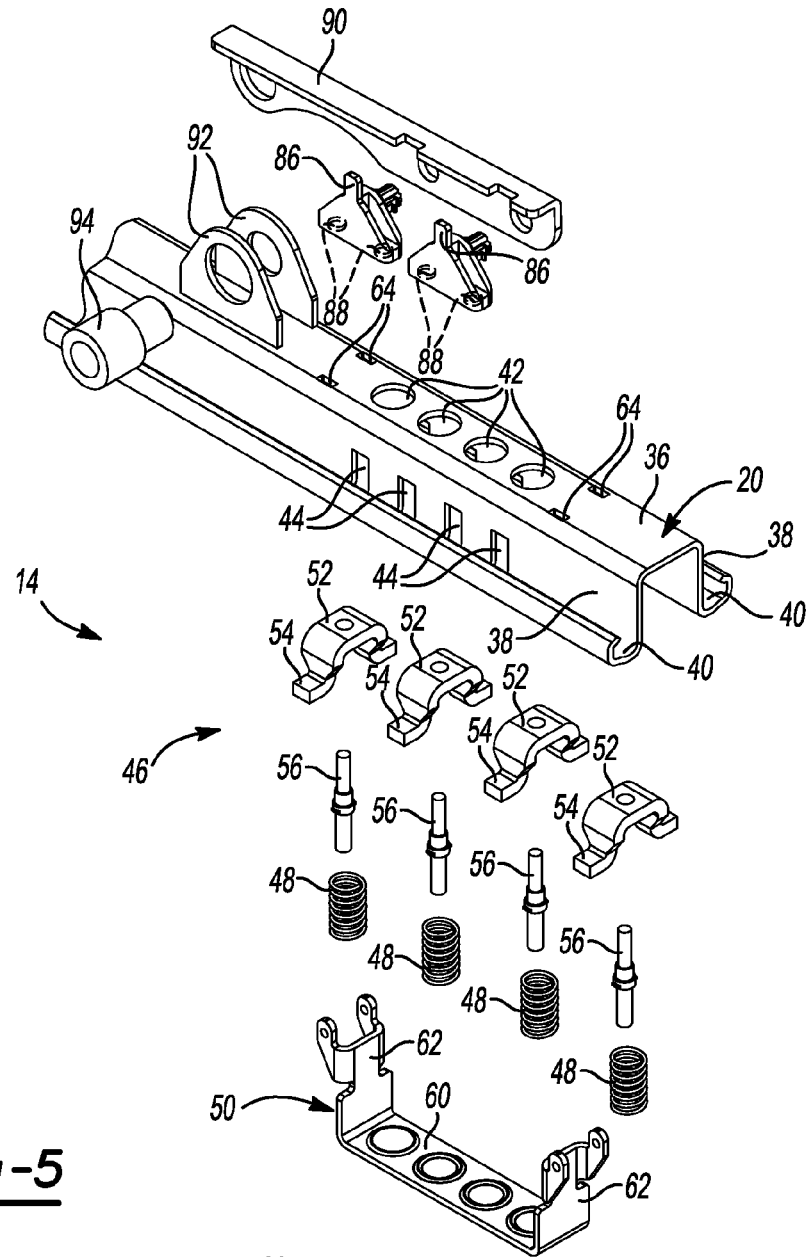
FIG. 5 is an exploded view of the track assembly of FIG. 3.

With particular reference to FIGS. 4 and 5, the upper track 20 is shown to include a top wall 36 and a pair of sidewalls 38. The top wall 36 may be integrally formed with the sidewalls 38, whereby each of the sidewalls 38 includes a channel 40 extending substantially along a length of the upper track 20. The top wall 36 may include a series of apertures 42 that receive a portion of the locking mechanism 22 therein while the sidewalls 38 may include a series of slots 44 that may be substantially aligned with the apertures 42 and may likewise receive a portion of the locking mechanism 22 therein. Finally, the upper track 20 may include a series of fasteners (not shown) that may be used to attach a portion of the seat assembly 12 (FIG. 1) to the upper track 20. The fasteners may be used to attach a portion of the seat assembly 12 to the upper track 20 to allow the seat assembly 12 to be moved with the upper track 20 when the upper track 20 is moved relative to the lower track 18.

Figure 3:
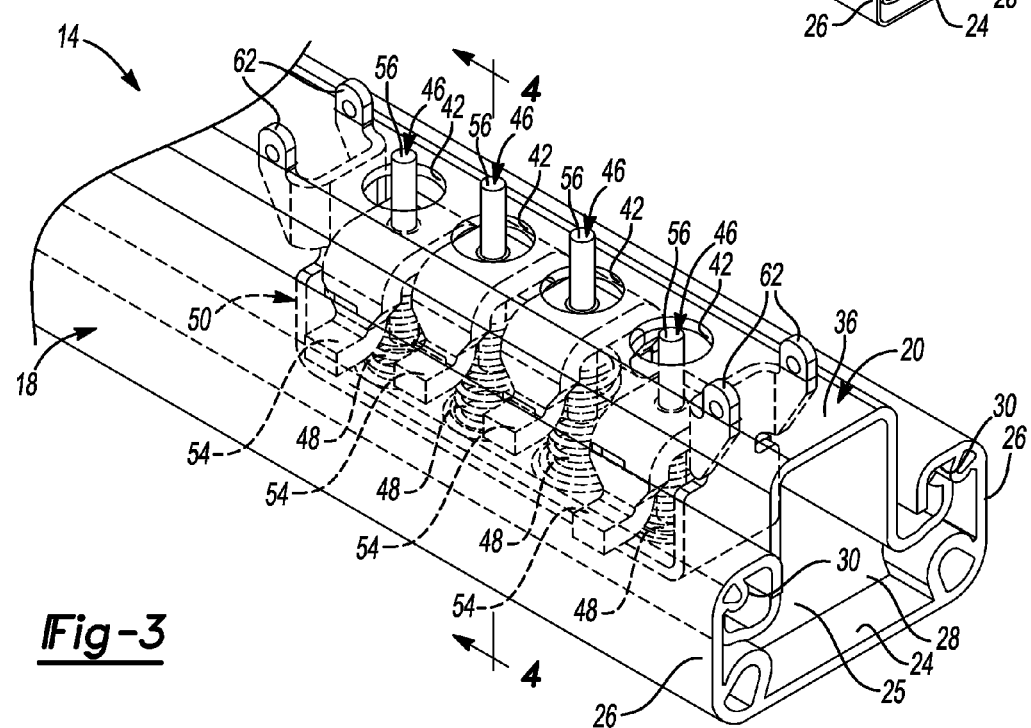
FIG. 3 is a partial perspective view of the track assembly of FIG. 2.
Figure 6:
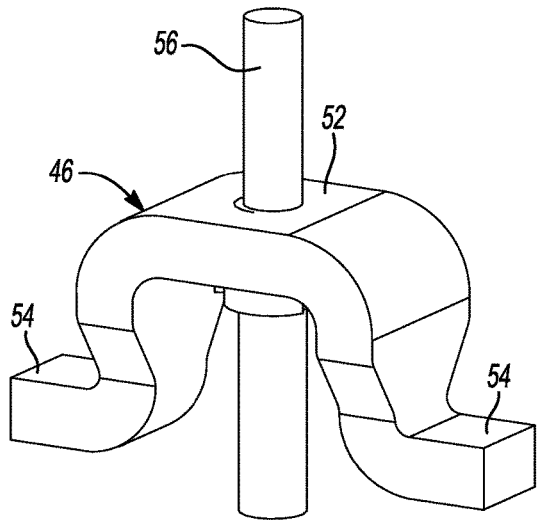
FIG. 6 is a perspective view of a locking pawl of the track assembly of FIG. 2.

With particular reference to FIGS. 3-5, the locking mechanism 22 is shown to include a series of locking pawls 46, a series of biasing members 48, and a mounting bracket 50. The locking pawls 46 may be received within the upper track 20 generally between the top wall 36 and the sidewalls 38 and may include a main body 52, a pair of locking arms 54, and an actuation arm 56. The locking arms 54 and actuation arm 56 may be integrally formed with the main body 52 (FIG. 6). Alternatively, the actuation arm 56 may be attached to the main body 52 via a suitable process such as, for example, staking and/or welding (FIGS. 4 and 5).

In one configuration, the biasing members 48 may be coil springs that generally surround a portion of the actuation arm 56 and are received within a pocket 58 (FIG. 4) of the locking pawls 46. The biasing members 48 are retained within the pocket 58 once the mounting bracket 50 is positioned relative to each locking pawl 46 and biasing member 48 to allow the mounting bracket 50 to properly position and retain the locking pawl 46 and biasing member 48 relative to the upper track 20.

The mounting bracket 50 may include a bottom wall 60 and a pair of upwardly extending arms 62. A portion of each arm 62 may extend through apertures 64 of the top wall 36 of the upper track 20 to permit the arms 62 to be staked or otherwise attached to the upper track 20. Attaching the arms 62 of the mounting bracket 50 to the upper track 20 retains the locking pawls 46 and biasing members 48 in a desired position generally between the bottom wall 60 of the mounting bracket 50 and the top wall 36 of the upper track 20.

While the locking mechanism 22 is described and shown as including a locking pawl 46 having a main body 52, a pair of locking arms 54, and an actuation arm 56 that is staked to (FIGS. 4 and 5) or integrally formed with (FIG. 6) the main body 52, the locking mechanism 22 could alternatively include a locking pawl having any of the configurations shown in FIGS. 7-13. In view of the substantial similarity in structure and function of the components associated with the locking pawl 46 with respect to the locking pawls shown in FIGS. 7-13, like reference numerals are used hereinafter and in the drawings to identify like components while like reference numerals containing letter extensions are used to identify those components that have been modified.

Figure 7:
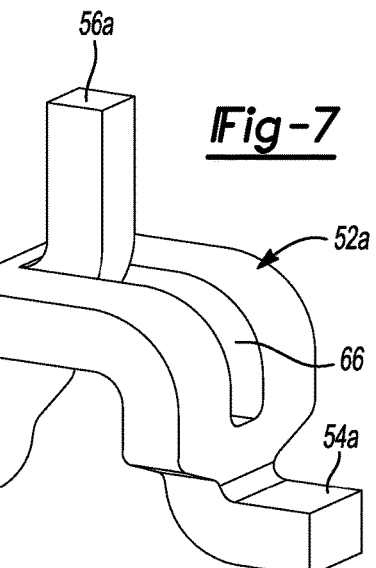
FIG. 7 is a perspective view of a locking pawl of the track assembly of FIG. 2.

For example, the locking pawls 46 could be replaced by the locking pawl 46a shown in FIG. 7. The locking pawl 46a is similar to the locking pawl 46 in that the locking pawl 46a includes a main body 52a having a pair of integrally formed locking arms 54a. However, the locking pawl 46a does not include an actuation arm that is staked or otherwise fixedly attached to the main body 52a but, rather, includes an integrally formed actuation arm 56a. The actuation arm 56a may be formed from a portion of the main body 52a, thereby forming a void 66 in the main body 52a where material is taken to form the actuation arm 56a.

Figure 8:
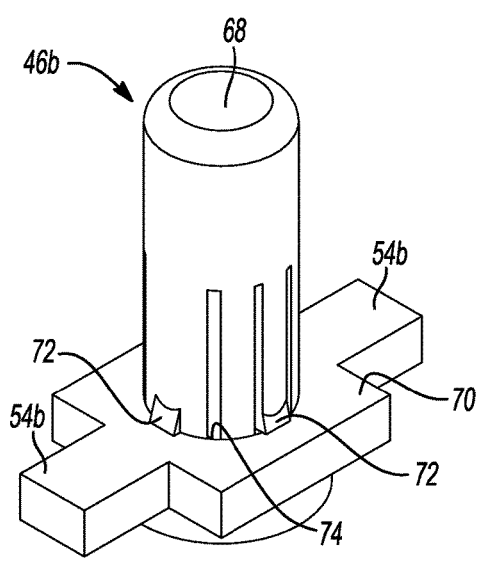
FIG. 8 is a perspective view of a locking pawl of the track assembly of FIG. 2.

With particular reference to FIG. 8, another locking pawl 46b is provided and may include a top cap 68 and a locking plate 70. The top cap 68 may receive a portion of the biasing member 48 therein and may extend through the apertures 42 of the upper track 20 once assembled thereto. The locking plate 70 may generally surround the top cap 68 and may be positioned by a series of tabs 72 of the top cap 68. The locking plate 70 may include a pair of locking arms 54b as well as a central aperture 74 that receives the top cap 68.

Figure 9:
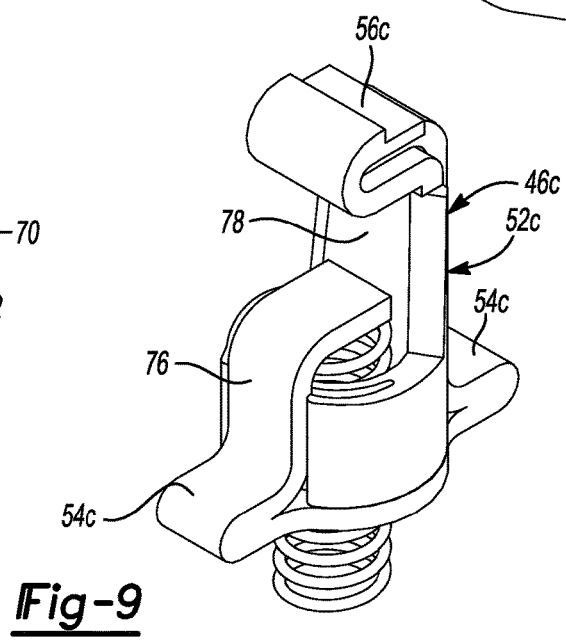
FIG. 9 is a perspective view of a locking pawl of the track assembly of FIG. 2.

With particular reference to FIG. 9, a locking pawl 46c is shown to include a main body 52c having a first component 76 formed from a metal material and a second component 78 formed from a plastic material. During assembly, the second component 78 may be molded onto the first component 76 such that a portion of the first component 76 and a portion of the second component 78 extend through the apertures 42 of the upper track 20 to form an actuation arm 56c. The first component 76 may cooperate with the second component 78 to receive and properly position the biasing member 48 relative to the locking pawl 46c and mounting bracket 50. Once attached to the upper track 20, the first component 76 and the second component 78 may extend through the apertures 42 while locking arms 54c of the first component 76 are slidably received within the slots 44 of the upper track 20.

Figure 10:
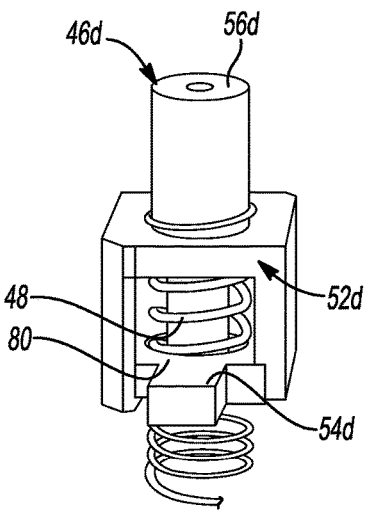
FIG. 10 is a perspective view of a locking pawl of the track assembly of FIG. 2.

With particular reference to FIG. 10, a locking pawl 46d is provided. The locking pawl 46d may include a main body 52d and a locking plate 80. The main body 52d may be formed from plastic and may include an integrally formed actuation arm 56d. The locking plate 80 may include a pair of locking arms 54d and may be attached to the main body 52d for movement therewith. The main body 52d and the locking plate 80 may receive a portion of the biasing member 48 therein to permit the biasing member 48 to apply a force on the main body 52d and, thus, the locking plate 80, when the main body 52d and the locking plate 80 are disposed between the mounting bracket 50 and the upper track 20. Once assembled, the actuation arm 56d may extend through the apertures 42 of the upper track 20 while the locking arms 54d are slidably received within the slots 44 of the upper track 20.

Figure 11:
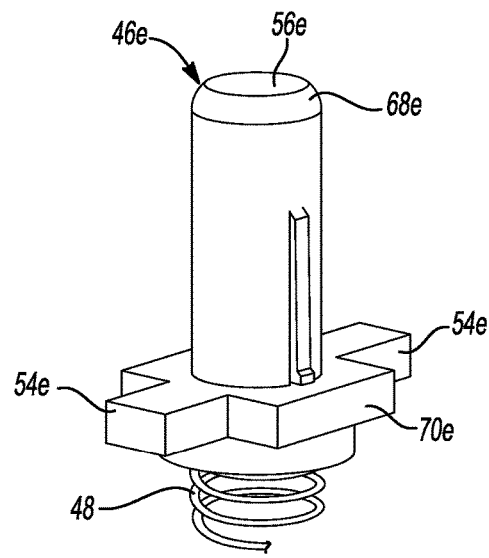
FIG. 11 is a perspective view of a locking pawl of the track assembly of FIG. 2.
Figure 12:
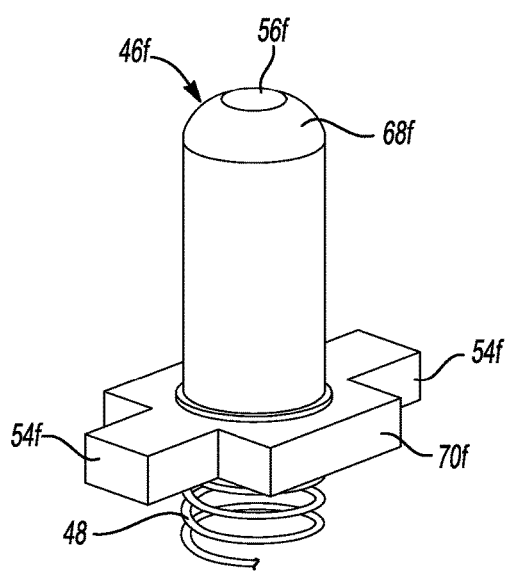
FIG. 12 is a perspective view of a locking pawl of the track assembly of FIG. 2.

With particular reference to FIGS. 11 and 12, a pair of locking pawls 46e and 46f are provided. The locking pawls 46e, 46f respectively incorporate a top cap 68e, 68f and are each fixed for movement with a respective locking plate 70e, 70f. The locking plates 70e, 70f may include a pair of locking arms 54e and 54f, respectively, and may be biased along with the top caps 68e, 68f, by the biasing member 48 once assembled to the upper track 20 by the mounting bracket 50. The locking pawls 46e, 46f are virtually identical in that a top portion of each top cap 68e, 68f includes an actuation arm 56e, 56f that extends through the apertures 42 of the upper track 20 and a pair of locking arms 54e, 54f that are slidably received within the slots 44 of the upper track 20 when assembled to the upper track 20. The only difference between the locking pawl 46e and the locking pawl 46f is that the top cap 68e of the locking pawl 46e is formed from a plastic material, while the top cap 68f of the locking pawl 46f is formed from a metal material such as, for example, steel.

Figure 13:
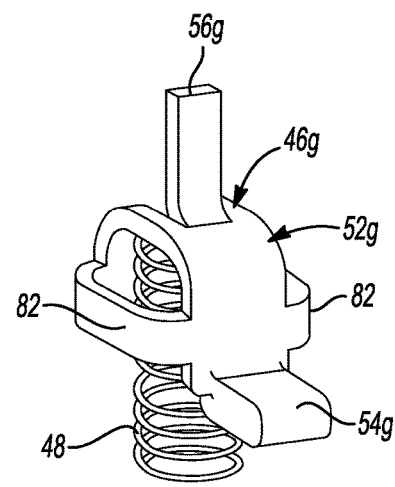
FIG. 13 is a perspective view of a locking pawl of the track assembly of FIG. 2.
Figure 18:
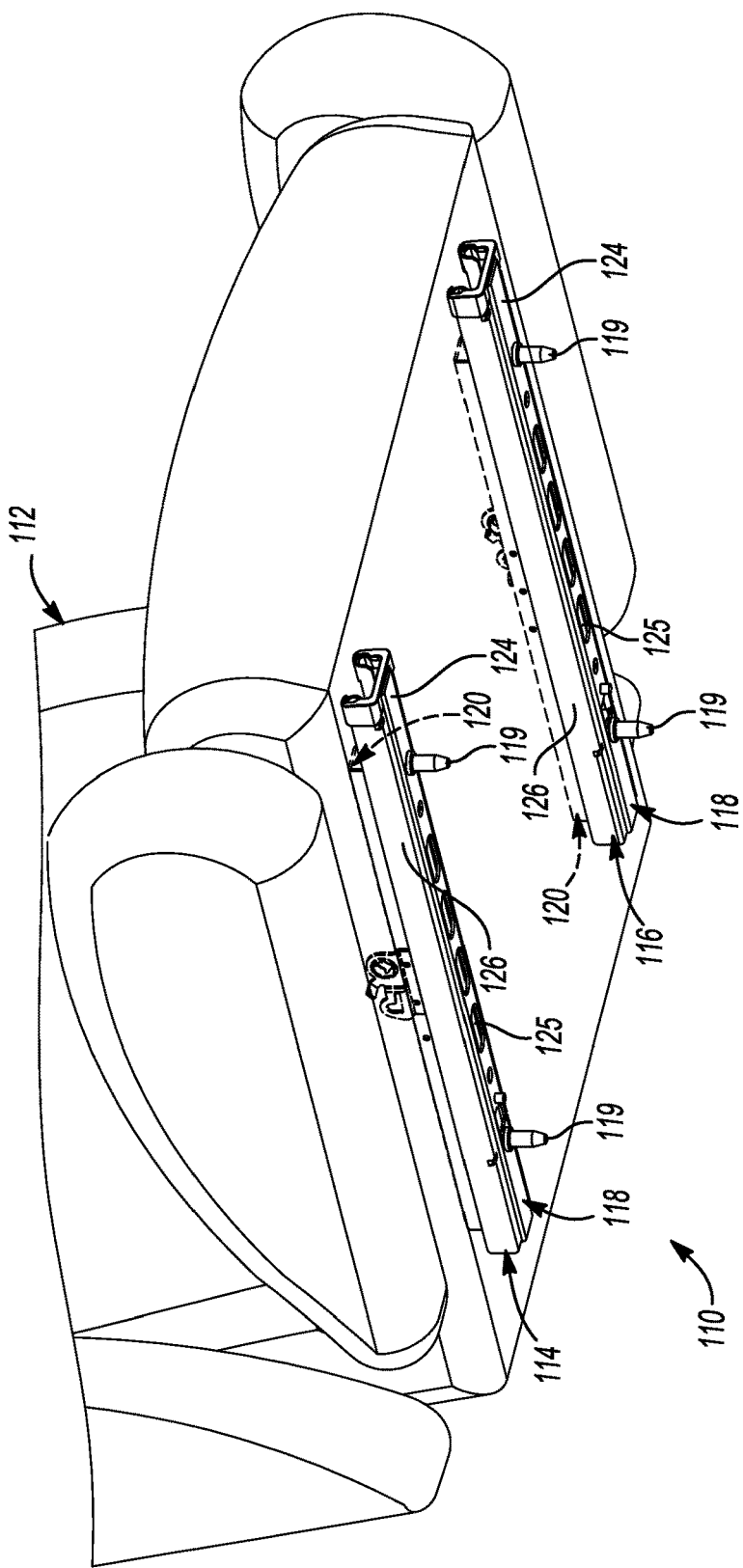
FIG. 18 is a partial perspective view of a seat assembly incorporating a seat-track assembly in accordance with the principles of the present disclosure.

With reference to FIG. 13, a locking pawl 46g is provided. The locking pawl 46g may include a main body 52g, a pair of locking arms 54g, and an actuation arm 56g. As with the locking pawl 46a (FIG. 7), each of the locking arms 54g and the actuation arm 56g are integrally formed with the main body 52g. However, the locking pawl 46g additionally includes a pair of support arms 82 that serve to further retain the biasing member 48 within the main body 52g once the locking pawl 46g is attached to the upper track 20 via the mounting bracket 50. Once assembled, the actuation arm 56g may extend through the apertures 42 of the upper track 20 while the locking arms 54g are slidably received within the slots 44 of the upper track 20.

While the locking mechanism 22 may include any of the foregoing locking pawls 46, 46a, 46b, 46c, 46d, 46e, 46f, 46g, the locking mechanism 22 will be described and shown hereinafter as incorporating four locking pawls 46 each having an actuation arm 56 that is staked or otherwise attached to the main body 52 (FIGS. 4 and 5). The four locking pawls 46 are positioned relative to the upper track 20 such that a portion of the actuation arm 56 extends through respective apertures 42 of the upper track 20 (FIGS. 2-4). Further, the locking pawls 46 are positioned relative to the upper track 20 such that the locking arms 54 extend through and are slidably received within the slots 44 of the upper track 20 (FIGS. 4 and 14).

Once the locking pawls 46 are properly positioned relative to the upper track 20 such that the actuation arms 56 extend through the apertures 42 and the locking arms 54 extend through the slots 44, the biasing members 48 may be respectively inserted over the actuation arms 56 (FIG. 4). At this point, the mounting bracket 50 may be positioned relative to each locking pawl 46 (FIG. 4) and may be attached to the upper track 20 (FIG. 2) to retain the locking pawls 46 and biasing members 48 generally between the top wall 36 of the upper track 20 and the bottom wall 60 of the mounting bracket 50. At this point, the biasing members 48 exert a force on the main body 52 of each locking pawl 46, thereby urging the locking pawls 46 toward the top wall 36 of the upper track 20.

Causing the main body 52 to move toward and engage the top wall 36 of the upper track 20 likewise causes the actuation arms 56 of the locking pawls 46 to extend from the top wall 36 of the upper track 20 through the apertures 42. The actuation arms 56 and, thus, the main body 52 and locking arm 54 of each locking pawl 46 may be moved away from the top wall 36 of the upper track 20 if a force is applied to the actuation arms 56 generally at the portion of the actuation arms 56 that extends through the apertures 42. Such a force must be sufficient to overcome the force applied to the main body 52 via the biasing member 48 and, once applied, causes the actuation arms 56 to retreat at least partially into the upper track 20 between the top wall 36 and the sidewalls 38. Because the actuation arms 56 are fixed for movement with the main body 52 and locking arms 54, movement of the actuation arms 56 into the upper track 20 causes the main body 52 to move away from the top wall 36 and causes the locking arms 54 to traverse the slots 44 and move away from the top wall 36 toward the channels 40 of the sidewalls 38 of the upper track 20.

With particular reference to FIG. 1, the seat-track assembly 10 is shown incorporated into the seat assembly 12. The seat assembly 12 may be fixedly attached to the upper track 20 such that the seat assembly 12 is fixed for movement with the upper track 20 relative to the lower track 18. The seat assembly 12 may include an actuation assembly 84 (FIG. 2) that permits selective movement of the actuation arms 56 relative to the upper track 20. The actuation assembly 84 may include one or more brackets 86 that include a number of apertures 88. The apertures 88 may be positioned relative to one another such that each aperture 88 receives an actuation arm 56. As such, interaction between the apertures 88 and the actuation arms 56 of the locking pawls 46 fixes the brackets 86 of the actuation assembly 84 for movement with the actuation arms 56 of the locking pawls 46.

The brackets 86 may be attached to an arm 90 of the actuation assembly 84 that coordinates movement between the brackets 86. Coordination between the respective brackets 86 permits the actuation assembly 84 to move the locking pawls 46 from a locked state to an unlocked state substantially simultaneously to allow selective adjustment of the upper track 20 and, thus, the seat assembly 12, in a fore-aft direction relative to and within the lower track 18, as will be described in greater detail below. In one configuration, the arm 90 may be pivotably supported by a pair of mounting flanges 92 that are attached to or integrally formed with the upper track 20. The mounting flanges 92 may receive a pivot 94 to rotatably support the arm 90 relative to the top wall 36 of the upper track 20.

With particular reference to FIGS. 15-17, operation of the seat-track assembly 10 will be described in detail. When the main bodies 52 of the locking pawls 46 are biased toward the top wall 36 of the upper track 20 via the biasing member 48, the actuation arms 56 extend from the top wall 36 and exert an upward force on the brackets 86 of the actuation assembly 84. In this position, the locking arms 54 of the locking pawls 46 are disposed within an upper portion of the slots 44 and are received in respective locking features 32 of the lower track 18. Positioning the locking arms 54 within respective locking features 32 of the lower track 18 places the seat-track assembly 10 in the locked state and, thus, restricts translation of the upper track 20 relative to the lower track 18.

While the locking arms 54 of the locking pawls 46 are described as engaging the locking features 32, the locking mechanism 22 is designed such that only two of the locking pawls 46 engage the locking features 32 of the lower track 18 at any given time. As such, four locking arms 54 (i.e., two locking arms 54 of two locking pawls 46) are respectively received within four locking features 32 of the lower track 18. When the locking arms 54 are received within the locking features 32, the upper track 20 is restricted from moving relative to the lower track 18 by the four locking arms 54.

The locking features 32 may include at least one tapered surface 96 such that each locking feature 32 decreases in width in the direction (X) shown in FIG. 17. Providing each locking feature 32 of the lower track 18 with a decreasing width in the direction (X) allows the biasing members 48 to urge the locking arms 54 into the locking features 32 and into engagement with the lower track 18, regardless of dimensional tolerances between the locking pawls 46 or lower track 18. Namely, the locking arms 54 continue to move into the locking features 32 until the locking arms 54 are wedged within each locking feature 32 and are securely in contact with a projection 34 of the lower track 18. The foregoing relationship reduces rattling amongst the various components and, therefore, reduces chucking during use.

As described, only two of the four locking pawls 46 engage the locking features 32 of the lower track 18 at any given time. The other two locking pawls 46 are essentially out-of-phase with the locking features 32 and engage the projections 34 disposed between the locking features 32 (FIG. 16). The locking arms 54 may include a substantially 5 mm width such that when the locking arms 54 are received within the locking features 32, a total clearance of 5 mm exists within each locking feature 32. Specifically, because each locking feature 32 includes a substantially 10 mm width, when a 5 mm locking arm 54 is received within the 10 mm locking feature 32, a total of a 5 mm clearance is provided between the locking arm 54 and the lower track 18.

When the locking arm 54 is initially received within the locking feature 32, the locking arm 54 is permitted to move generally within the locking feature 32—caused by relative movement between the upper track 20 and the lower track 18—until the locking arm 54 moves into one of sector (A) or sector (B) and engages an adjacent projection 34. Movement of the locking arm 54 into one of sector (A) or sector (B) dictates which of the other locking arms 54 will engage the locking features 32 of the lower track 18 and which of the other locking arms 54 will be out-of-phase and engage the projections 34. For example, if the locking arms 54 of a first locking pawl 46 are received within sector (A) of one of the locking features 32, a second locking pawl 46 may engage a locking feature 32. However, if the locking arms 54 of the first locking pawl 46 are received within sector (B) of the same locking feature 32, the second locking pawl 46 may be out-of-phase and may engage a projection 34. In this state, one of the other locking pawls 46 (i.e., a third locking pawl 46 or fourth locking pawl 46) will engage another locking feature 32 to place the locking mechanism 22 in the locked state.

The foregoing relationship provides the seat-track assembly 10 with a 5 mm increment during adjustment with a maximum of 2.5 mm of travel to allow a second locking pawl 46 to engage the locking features 32. Specifically, if the first locking pawl 46 is received within a locking feature 32 at the center of the locking feature 32, the locking pawl 46 need only travel 2.5 mm in either direction before contacting an adjacent projection 34 and fully moving into sector (A)

or sector (B). In light of the foregoing description, it will be appreciated that the locking mechanism 22 is a positive engagement latch (PEL) mechanism. That is, at least one of the pawls 46 will be received in the locking features 32 in the lower track 18 upon release of the actuation assembly 84 regardless of the position of the upper track 20 relative to the lower track 18.

Once two of the locking pawls 46 are securely received within two respective locking features 32 of the lower track 18, the upper track 20 and, thus, the seat assembly 12 are restricted from moving relative to the lower track 18. The seat assembly 12 may only be moved relative to the lower track 18 when a force is applied to the actuation assembly 84, thereby causing the brackets 86 to apply a force on the actuation arms 56 of the locking pawls 46. Application of a force on the actuation arms 56 causes the actuation arms 56 to likewise apply a force on the biasing members 48 via the main body 52, which causes compression of the biasing members 48. Movement of the main body 52 against the biasing members 48 likewise causes movement of the locking arms 54 in a direction generally away from the top wall 36 of the upper track 20 and within each slot 44.

Sufficient movement of the locking arms 54 within each slot 44 in a direction substantially away from the top wall 36 of the upper track 20 causes the locking arms 54 to move into the unlocked state and disengage the locking features 32, thereby permitting movement of the upper track 20 and, thus, the seat assembly 12, relative to the lower track 18. The locking pawls 46 are automatically returned to the locked state when the force applied to the brackets 86 is released due to the biasing members 48. Specifically, once the force exerted on the actuation arms 56 by the brackets 86 is released, the biasing members 48 are once again permitted to bias the main body 52 and, thus, the locking arms 54 of each locking pawl 46 into a locked state. Namely, the biasing members 48 are permitted to move the locking arms 54 within each slot 44 generally toward the top wall 36 of the upper track 20 and allow two of the locking pawls 46 to engage the locking features 32. Once the locking arms 54 are received within the locking features 32, the upper track 20 and, thus, the seat assembly 12, are once again restricted from moving relative to the lower track 18.

With particular reference to FIGS. 18-25 another seat-track assembly 110 for use with a seat assembly 112 is provided. The seat-track assembly 110 may include a first track assembly 114 and a second track assembly 116 that cooperate to selectively permit fore and aft adjustment of the seat assembly 112 relative to an external structure such as, for example, a floorpan of a vehicle (neither shown). The first track assembly 114 and the second track assembly 116 may be identical in both structure and function. Accordingly, only the first track assembly 114 will be described and shown in detail.

The first track assembly 114 may include a lower track 118 fixedly attached to a floorpan of a vehicle (neither shown), an upper track 120 slidably supported by the lower track 118 relative to the floorpan, and a locking mechanism 122 at least partially disposed between the lower track 118 and the upper track 120. In operation, the locking mechanism 122 may selectively fix a position of the upper track 120 relative to the lower track 118 when in a locked state and may permit movement of the upper track 120 relative to the lower track 118 when in an unlocked state.

The lower track 118 may be attached to the floorpan via a suitable process such as, for example, welding and/or staking and may include one or more projections 119 to facilitate attachment of the lower track 118 to the floorpan.

The lower track 118 may include a bottom wall 124 having a series of openings 125 and a pair of sidewalls 126 that extend generally from the bottom wall 124. The bottom wall 124 may be integrally formed with the sidewalls 126 and may cooperate with the sidewalls 126 to form a channel 128 extending substantially along a length of the lower track 118. The sidewalls 126 may also include a channel 130 extending along a length of each sidewall 126 and may include a series of locking features 132 separated by a series of projections 134.

Figure 25:
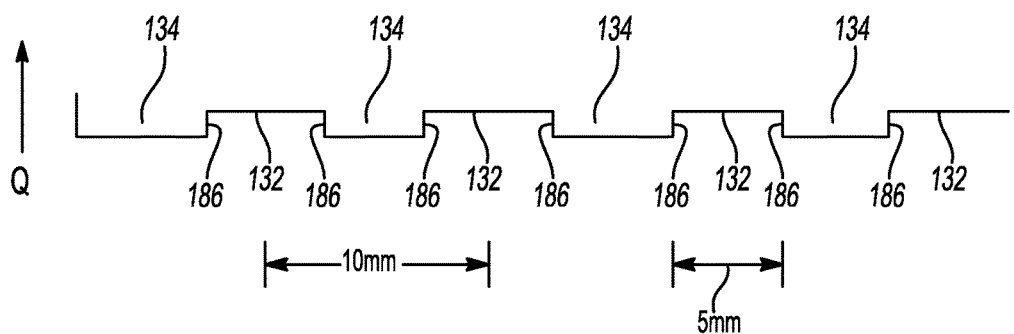
FIG. 25 is a schematic representation of a portion of a track of the track assembly of FIG. 18 illustrating locking features.

The locking features 132 may each include a width substantially equal to 5 mm, for example, such that center portions of adjacent locking features 32 are separated by approximately 10 mm (FIG. 25). As shown in FIG. 25, adjacent locking features 132 are separated from one another by a projection 134, which likewise may include a width substantially equal to 5 mm. As will be described in greater detail below, each locking feature 132 may receive and position a portion of the locking mechanism 122 therein to selectively prevent movement of the upper track 120 relative to the lower track 118.

As described above, the lower track 118 slidably receives the upper track 120 to permit selective movement of the upper track 120 relative to the lower track 118. Such movement may be facilitated by one or more ball-cage assemblies 121 that may be at least partially received within the channels 130 of the sidewalls 126. The ball-cage assemblies 121 may each include a pair of housings 123 having one or more ball bearings 125 (FIG. 21) and a bracket 127 extending between and connecting the housings 123. The ball bearings 125 are constrained by the housings 123 but are permitted to rotate relative thereto. Such rotation of the ball bearings 125 relative to the housings 123 facilitates movement of the upper track 120 relative to the lower track 118 when the locking mechanism 122 is in the unlocked state.

Figure 19:
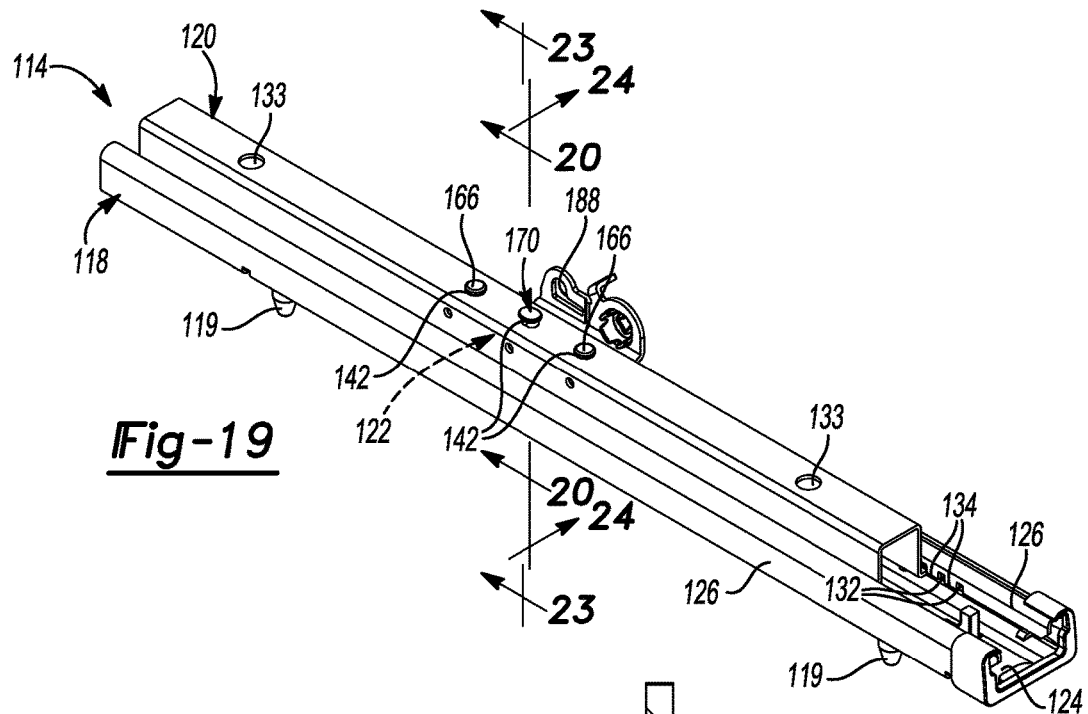
FIG. 19 is a perspective view of a track assembly of the seat-track assembly of FIG. 18.
Figure 20:
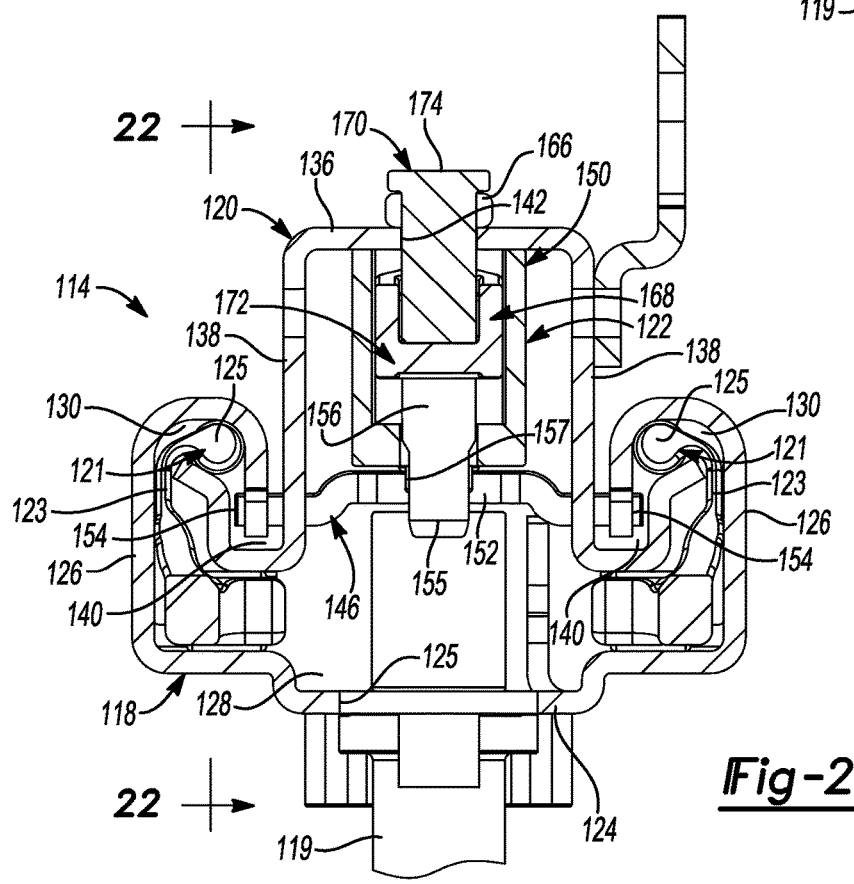
FIG. 20 is a cross-sectional view of the track assembly of FIG. 18 taken along line 20-20.

With particular reference to FIGS. 19 and 20, the upper track 120 is shown to include a top wall 136 and a pair of sidewalls 138. The top wall 136 may be integrally formed with the sidewalls 138, whereby each of the sidewalls 138 includes a channel 140 extending substantially along a length of the upper track 120. The top wall 136 may include a series of apertures 142 that receive a portion of the locking mechanism 122 therein. The sidewalls 138 may include a series of slots 144 that may be substantially aligned with the apertures 142 and may likewise receive a portion of the locking mechanism 122 therein. Finally, the upper track 120 may include a series of mounting apertures 133 (FIG. 21) that cooperate with fasteners (none shown) to attach a portion of the seat assembly 112 (FIG. 18) to the upper track 120. The fasteners may be used to attach a portion of the seat assembly 112 to the upper track 120 to allow the seat assembly 112 to be moved with the upper track 120 when the upper track 120 is moved relative to the lower track 118.

Figure 21:
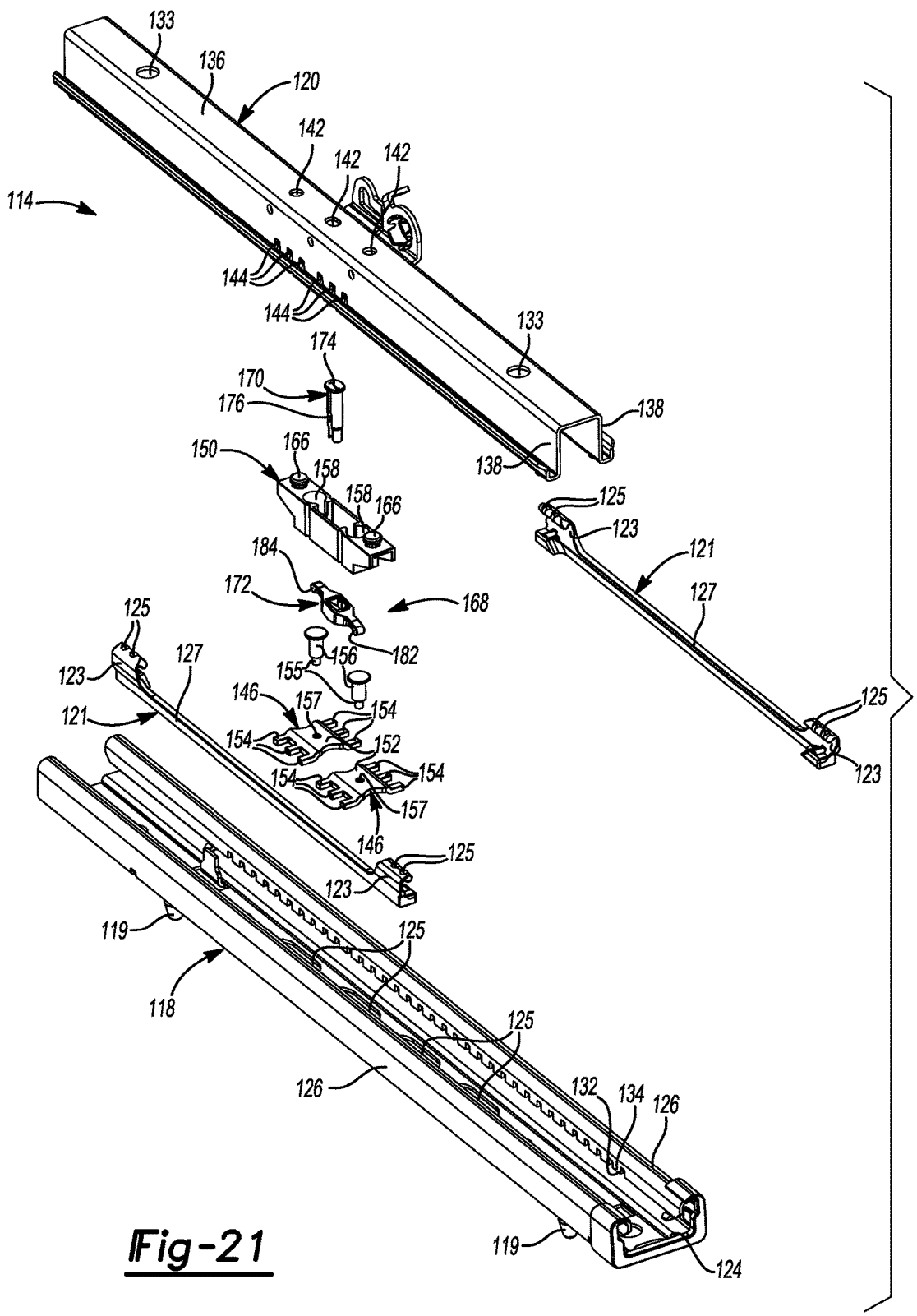
FIG. 21 is an exploded view of the track assembly of FIG. 19.

With particular reference to FIGS. 20-24, the locking mechanism 122 is shown to include a series of locking pawls 146, a series of biasing members 148, and a mounting bracket 150. The locking pawls 146 may be received within the upper track 120 generally between the top wall 136 and the sidewalls 138 and may include a main body 152, a pair of locking arms 154, and an actuation arm 156. The locking arms 154 and the actuation arms 156 may be integrally formed with the main body 152 (FIG. 21). Alternatively, the actuation arms 156 may separately formed from the main body 152 and may be fixed for movement with the main body 152 by inserting a distal end 155 of the actuation arms 156 into respective apertures 157 formed in the main body 152. The distal end 155 of each actuation arm 156 may be press-fit into the respective apertures 157 and/or may be retained via a suitable process such as, for example, welding or staking.

In one configuration, the biasing members 148 may be coil springs that generally surround a portion of each actuation arm 156 and are received within a pocket 158 (FIG. 24) of the mounting bracket 150. The biasing members 148 are retained within the pocket 158 to allow the biasing members 148 to exert a force on each locking pawl 146—via each actuation arm 156—to bias each locking pawl 146 in the W direction shown in FIG. 24.

The mounting bracket 150 may include a bottom wall 160, a top wall 162, and a pair of stop features 164. The bottom wall 160 may be disposed at a bottom of the pocket 158 and may interact with the biasing members 148 to retain and position each biasing member 148 within the mounting bracket 150. The top wall 162 may abut the top wall 136 of the upper track 120 and may be attached to the top wall 136 via a pair of rivets 166. Specifically, the rivets 166 may be respectively received within the apertures 142 of the upper track 120 to retain and position the mounting bracket 150 relative to the upper track 120.

The stop features 164 may be spaced apart from the bottom wall 160 by a predetermined distance and may cooperate with the bottom wall 160 to define the pocket 158 in which the biasing members 148 are disposed. The stop features 164 may interact with the actuation arms 156 to limit movement of the actuation arms 156 in a direction opposite direction W (FIG. 24) when the biasing members 148 are compressed (FIG. 22).

Figure 22:
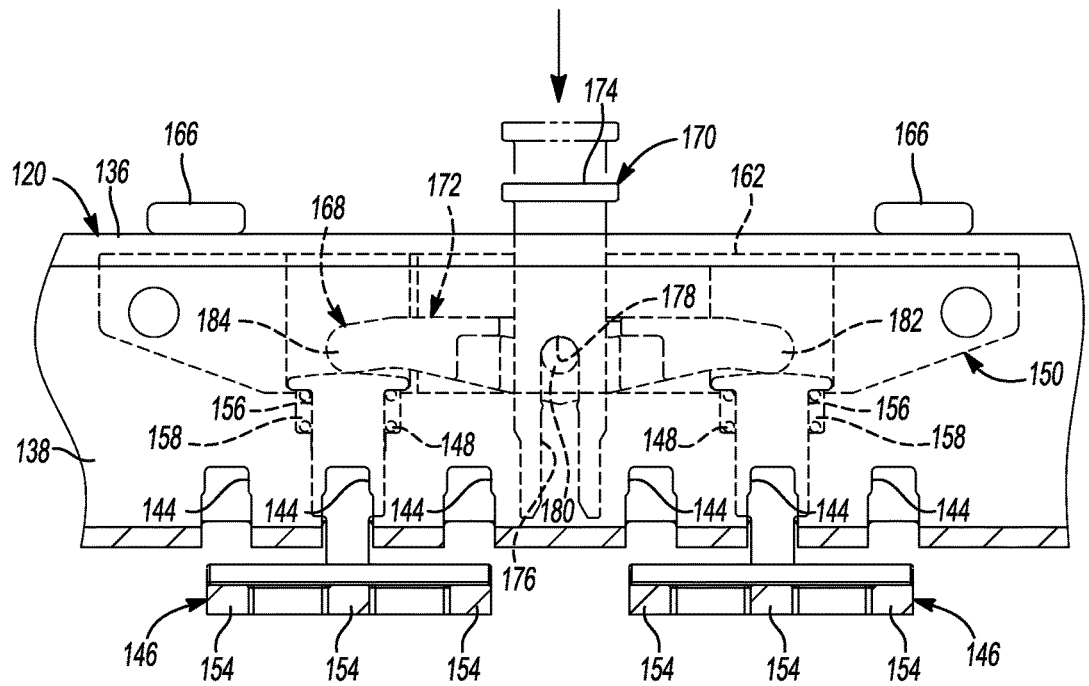
FIG. 22 is a partial cross-sectional view of the track assembly of FIG. 18 in an unlocked state taken along line 22-22.

An actuation mechanism 168 may be supported by the mounting bracket 150 to move the locking pawls 146 from a locked state (FIG. 23) to an unlocked state (FIG. 22). The actuation mechanism 168 may include an actuation pin 170 and a rocker arm 172 that cooperate to selectively exert a force on the actuation arms 156 to move the locking pawls 146 from the locked state to the unlocked state. In light of the foregoing description, it will be appreciated that the locking mechanism 122 can be preassembled as a cartridge or module by fastening the mounting bracket 150 to the upper track 120 with the rivets 166, as described above. Providing the locking mechanism 122 as a preassembled cartridge can simplify manufacturing and assembly of the seat-track assembly 110.

Figure 24:
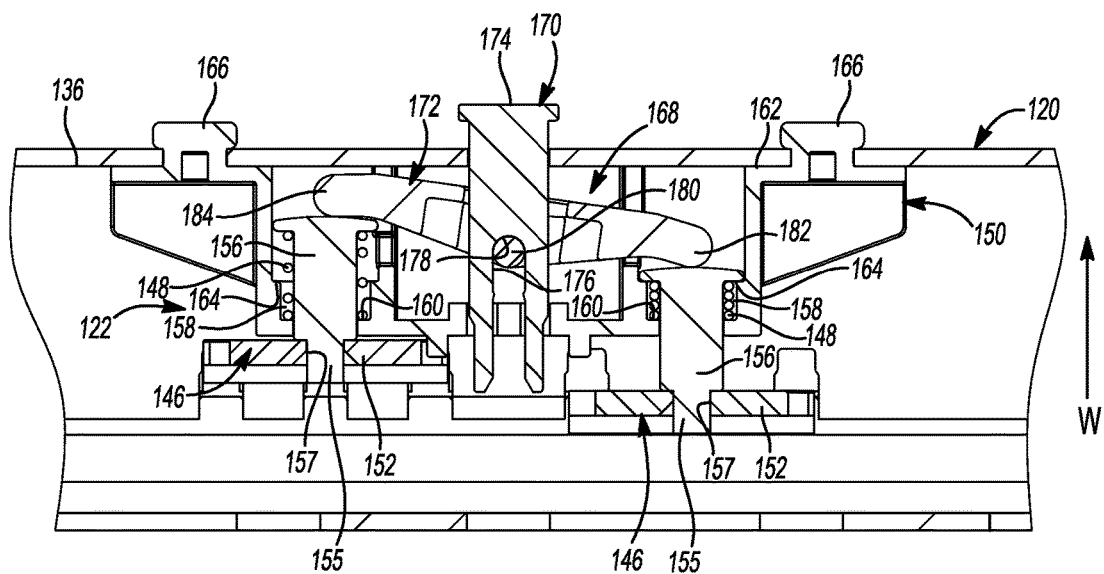
FIG. 24 is a partial cross-sectional view of the track assembly of FIG. 18 in a locked state taken along line 24-24.

The actuation pin 170 may include an engagement surface 174 and a slot 176. The engagement surface 174 may protrude from the top wall 136 of the upper track 120 when the actuation pin 170 is inserted into one of the apertures 142 formed in the top wall 136 of the upper track 120. The slot 176 may be blind slot that extends into the actuation pin 170 and includes an arcuate inner surface 178 (FIG. 24). The rocker arm 172 may be pivotably attached to the actuation pin 170 via the slot 176. Specifically, the rocker arm 172 may include a pivot 180 that is rotatably attached to the slot 176 at the arcuate inner surface 178. The rocker arm 172 may additionally include a first extension 182 and a second extension 184 that are in contact with respective actuation arms 156 of the locking mechanism 122. As will be described in greater detail below, the first extension 182 and the second extension 184 may selectively transmit a force to the locking pawls 146 via the actuation arms 156 to move the locking arms 146 into the unlocked state (FIG. 22) when a force is applied to the actuation pin 170 at the engagement surface 174.

Figure 23:
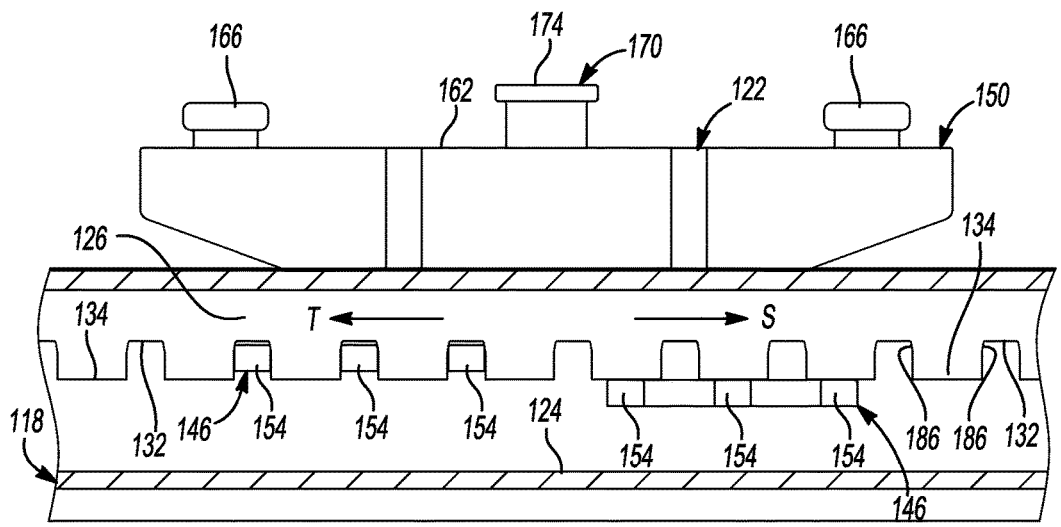
FIG. 23 is a partial cross-sectional view of the track assembly of FIG. 18 in a locked state taken along line 23-23.

With particular reference to FIGS. 22-25, operation of the seat-track assembly 110 will be described in detail. When the seat-track assembly 110 is in the locked state, one of the locking pawls 146 is in the locked state such that the locking arms 154 of the locking pawl 146 are received within respective locking features 132 of the lower track 118 (FIG. 23). The locking arms 154 may be in contact with the lower track 118 at two points within each locking feature 132 to restrict relative movement between the lower track 118 and the upper track 120 in two opposite directions. Namely, interaction between each locking arm 154 and the lower track 118 within each locking feature 132 of the lower track 118 restricts relative movement between the lower track 118 and the upper track 120 in the direction (S) and in the direction (T), as shown in FIG. 23.

The locking features 132 of the lower track 118 may include a pair of tapered surfaces 186 that cause each locking feature 132 to have a decreasing width in a direction (Q) moving away from the bottom wall 124 (FIG. 25). As such, when the biasing members 148 exert a force on the locking pawls 146 to urge the locking arms 154 into the locking features 132, the locking arms 154 continue movement into the locking features 132 until the locking arms 154 are in contact with the lower track 118 at two locations within each locking feature 132 at the tapered surfaces 186 (FIG. 23).

The locking pawls 146 are biased into the locked state and, as a result, into the locking features 132 of the lower track by the biasing members 148. Specifically, the biasing members 148 are disposed within the pocket 158 of the mounting bracket 150 and exert a force on each actuation arm 156. Exerting a force on the actuation arms 156 causes the actuation arms 156 to likewise apply a force on the rocker arm 172 at the first extension 182 and the second extension 184. If the locking arms 154 of the locking pawls 146 are aligned with the locking features 132 of the lower track 118, the biasing members 148 cause the actuation arms 156 to apply a force on one of the extensions 182, 184 to rotate the rocker arm 172 about the pivot 180 relative to the actuation pin 170. Continued movement of the actuation arms 156 generally away from the bottom wall 124 of the lower track 118 causes the locking arms 154 to move into respective locking features 132 of the lower track 118 to restrict relative movement between the lower track 118 and the upper track 120.

As shown in FIG. 23, only one of the locking pawls 146 is aligned with the locking features 132 when the locking mechanism 122 is in the locked state. As such, when the locking arms 154 of one of the locking pawls 146 are received within the locking features 132 and, therefore, are in the locked state, the locking arms 154 of the other locking pawl 146 are not aligned with the locking features 132 of the lower track 118 but, rather, are aligned and are in contact with the projections 134 of the lower track 118. As a result, when the locking mechanism 122 is in the locked state, only one of the locking pawls 146 is in the locked state such that the locking arms 154 are received within the locking features 132.

The locking mechanism 122 may be moved from the locked state (FIG. 23) to the unlocked state (FIG. 22) when a force is applied to the actuation pin 170 at the engagement surface 174. The force applied to the actuation pin 170 may be generated by an actuation assembly (not shown) similar to the actuation assembly 84 associated with the seat-track assembly 10 of FIG. 1. Such an actuation assembly may be supported relative to the upper track via a mounting bracket 188 (FIG. 19) to allow the actuation assembly to selectively exert a force on the actuation pin 170.

Regardless of the particular configuration of the actuation assembly, when a force is applied to the actuation pin 170 at the engagement surface 174 in the direction shown in FIG. 22, the actuation pin 170 moves toward the top wall 136 of the upper track 120 and, as a result, causes the slot 176 to likewise move further into the mounting bracket 150. Movement of the slot 176 further into the mounting bracket 150 relative to the upper track 120 causes the arcuate inner surface 178 of the slot 176 to exert a force on the pivot 180 to cause the pivot 180 to move with the actuation pin 170. Moving the pivot 180 with the actuation pin 170 in the direction shown in FIG. 22 likewise causes the rocker arm 172 to move with the actuation pin 170.

Movement of the pivot 180 causes the rocker arm 172 to likewise move further into the mounting bracket 150, which causes the first extension 182 and the second extension 184 to exert a force on the respective actuation arms 156 of the locking mechanism 122. The force is exerted on the actuation arms 156 via the first extension 182 and the second extension 184 of the rocker arm 172 and causes the actuation arms 156 to compress the biasing members 148 within respective pockets 158 of the mounting bracket 150. In so doing, the rocker arm 172 causes the locking arms 154 of the locking pawls 146 to disengage the locking features 132 of the lower track 118. Once the locking arms 154 of the locking pawls 146 disengage the respective locking features 132 of the lower track 118, relative movement between the lower track 118 and the upper track 120 is permitted. As such, a force may be applied to the seat assembly 112 to adjust a position of the seat assembly 112 relative to the lower track 118 by moving the seat assembly 112 along with the upper track 120 relative to the lower track 118.

Once a desired position of the seat assembly 112 and, thus, a desired position of the upper track 120 relative to the lower track 118 is achieved, the force applied to the actuation pin 170 may be released. When the force applied to the actuation pin 170 is released, the biasing members 148 once again exert a force on the actuation arms 156, thereby causing the actuation arms 156 to likewise exert a force on the first extension 182 and the second extension 184 of the rocker arm 172. If the locking pawls 146 are positioned relative to the locking features 132 and the projections 134 of the lower track 118 such that each locking arm 154 opposes a projection 134, the biasing members 148 cause the locking arms 154 to engage the projections 134, thereby preventing the locking arms 154 from being received within the locking features 132 and returning the locking mechanism 122 to the locked state.

At this point, a force may be applied to the upper track 120 via the seat assembly 112 to move the upper track 120 relative to the lower track 118. Movement of the upper track 120 relative to the lower track 118 causes the locking arms 154 of the locking pawls 146 to travel along the projections 134 until one of the locking pawls 146 is properly aligned with the locking features 132 such that the locking arms 154 of the one locking pawl 146 may be received within respective locking features 132 of the lower track 118.

When the upper track 120 is sufficiently moved relative to the lower track 118 such that one of the locking pawls 146 is aligned with the locking features 132, the biasing members 148 rotate the rocker arm 172 relative to the actuation pin 170 about the pivot 180, thereby moving one of the actuation arms 156 toward the top wall 136 of the upper track 120. In so doing, one of the locking pawls 146 is likewise moved toward the top wall 136 of the upper track 120, which causes the locking arms 154 to engage the locking features 132 of the lower track 118, thereby returning the locking mechanism 122 to the locked state.

As shown in FIG. 25, if the locking arms 154 of both of the locking pawls 146 initially engage the projections 134 such that the upper track 120 must be moved relative to the lower track 118 to allow one of the locking pawls 146 to be aligned with the locking features 132, movement of the upper track 120 relative to the lower track 118 is limited to approximately five millimeters (5 mm). Specifically, because the distance between the centers of adjacent locking features 132 is approximately equal to ten millimeters (10 mm), movement of the upper track 120 in either the direction (S) or the direction (T; FIG. 23) is limited to approximately five millimeters (5 mm) until one of the locking pawls 146 engages the locking features 132 of the lower track 118. Once one of the locking pawls 146 is received by the locking features 132 of the lower track 118, the biasing members 148—via the actuation arms 156—cause the locking arms 154 to move into the locking features 132 and engage the lower track 118 at two locations within each locking feature 132 due to the tapered surfaces 186 of each locking feature 132. When one of the locking pawls 146 is in the locked state such that the locking arms 154 are in contact with the lower track 118 at two locations within each locking feature 132, the locking mechanism 122 is returned to the locked state and relative movement between the upper track 120 and the lower track 118 is restricted in the direction (S) and the direction (T).

As shown in FIG. 21, each locking pawl 146 may include six (6) locking arms 154. Namely, each locking pawl 146 may include three locking arms 154 on one side of the locking pawl 146 and may likewise include three locking arms 154 on the other side of the locking pawl 146. As such, when the locking arms 154 are in the locked state and are respectively received within locking features 132 of the lower track 118, a total of six (6) locking arms 154 are engaged with the locking features 132 of the lower track 118 while a total of six (6) locking arms 154 of the other locking pawls 146 are in contact with the projections 134 of the lower track 118. While the locking pawls 146 are described and shown as each including six (6) locking arms 154, the locking pawls 146 may include a different number of locking arms 154. For example, each locking pawl 146 may include four (4) locking arms 154 or, alternatively, may include eight (8) locking arms 154.

Regardless of the particular construction of the locking pawls 146, when the locking mechanism 122 is in the locked state, each locking arm 154 of one of the locking pawls 146 is received within a respective locking feature 132 of the lower track 118 while the locking arms 154 of the other locking pawls 146 are in contact with the projections 134 and, therefore, are not received within the locking features 132 of the lower track 118. In short, only one of the locking pawls 146 includes locking arms 154 that are received within locking features 132 of the lower rack 118 when the locking mechanism 122 is in the locked state to restrict relative movement between the upper track 120 and the lower track 118.

Figure 27:
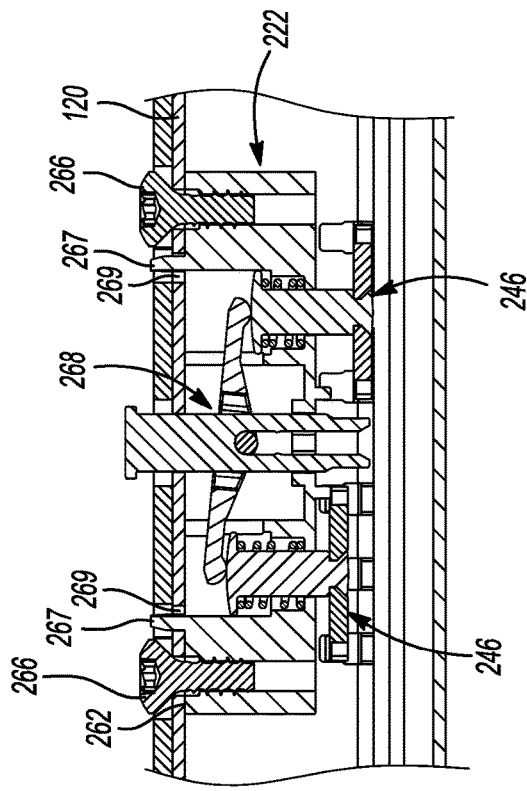
FIG. 27 is a partial cross-sectional view of the locking mechanism of FIG. 26 installed in a seat-track assembly.
Figure 26:
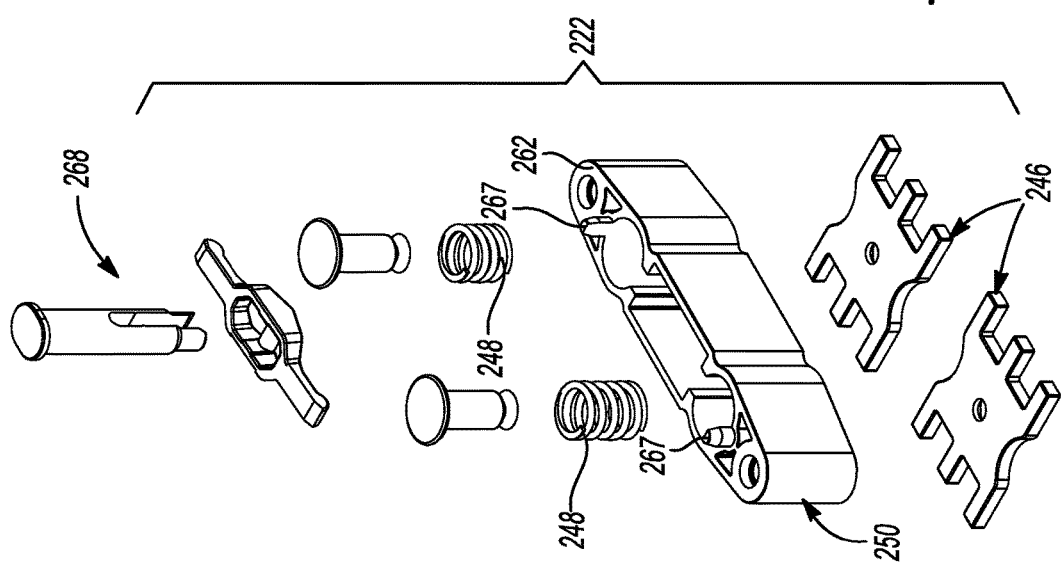
FIG. 26 is an exploded perspective view of a locking mechanism in accordance with the principles of the present disclosure.
Figure 30:
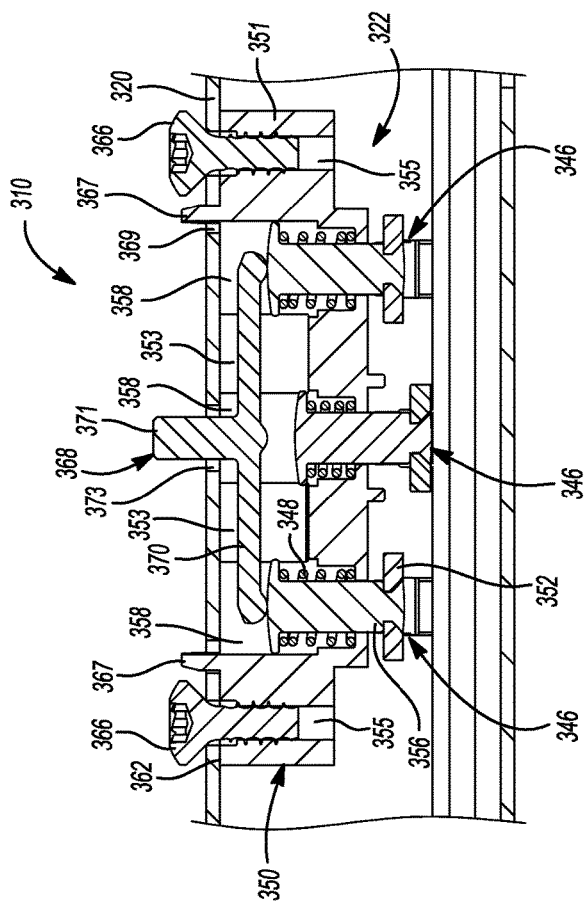
FIG. 30 is a partial cross-sectional view of the locking mechanism of FIG. 29 installed in a seat-track assembly.
Figure 29:
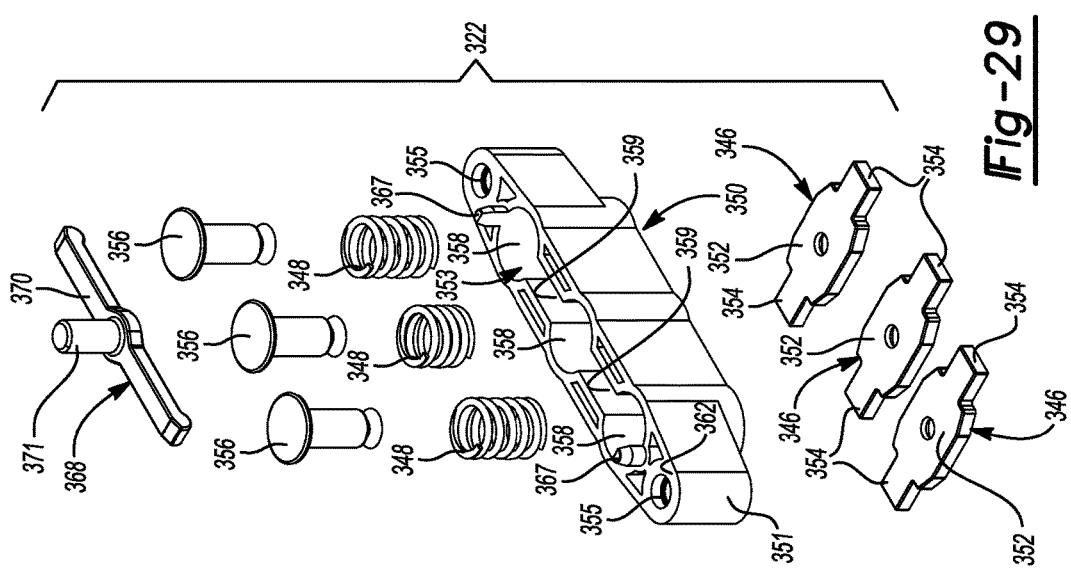
FIG. 29 is an exploded perspective view of a locking mechanism in accordance with the principles of the present disclosure.
Figure 35:
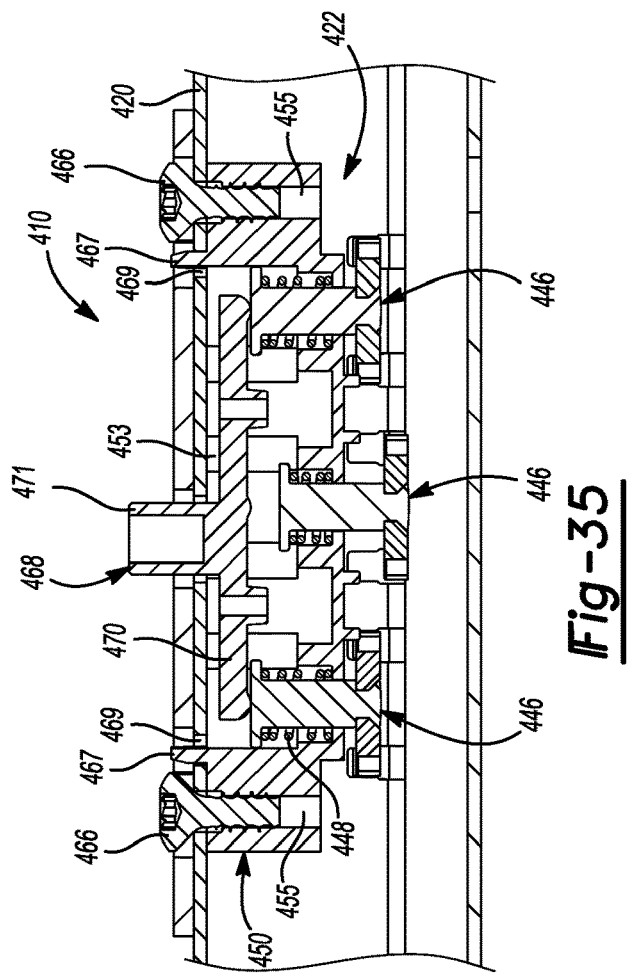
FIG. 35 is a partial cross-sectional view of the locking mechanism of FIG. 34 installed in a seat-track assembly.
Figure 34:
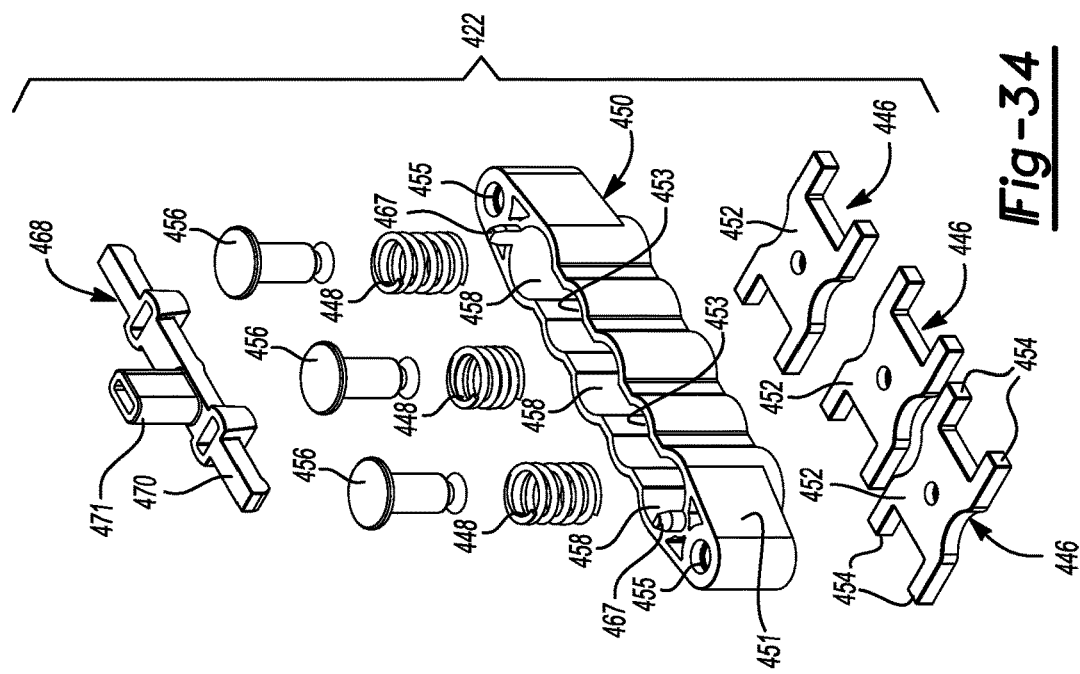
FIG. 34 is an exploded perspective view of a locking mechanism in accordance with the principles of the present disclosure.

Referring now to FIGS. 26-28, another locking mechanism 222 is provided that could be incorporated into the seat-track assembly 110 in place of the locking mechanism 122. The structure and function of the locking mechanism 222 may be similar or identical to that of the locking mechanism 122 described above, apart from any exceptions described below and/or shown in the figures. Therefore, similar features and functions will not be described again in detail.

Like the locking mechanism 122, the locking mechanism 222 may include a series of locking pawls 246, a series of biasing members 248, a mounting bracket or housing 250, and an actuation mechanism 268. As described above, the locking mechanism 222 can be preassembled as a cartridge or module by fastening the mounting bracket 250 to the upper track 120 with threaded fasteners 266. Providing the locking mechanism 222 as a preassembled cartridge can simplify manufacturing and assembly of the seat-track assembly 110. The mounting bracket 250 may also include one or more tabs 267 that protrude upward from a top wall 262 of the mounting bracket 250. The tabs 267 may extend through apertures 269 in the upper track 120 and may facilitate alignment of the mounting bracket 250 relative to the upper track 120 during installation of the locking mechanism 222 into the seat-track assembly 110. In some configurations, the tabs 267 may snap into engagement with the apertures 269 to retain the locking mechanism 22 in place until the fasteners 266 can be installed to more securely fix the locking mechanism 222 to the upper track 120.

Referring now to FIGS. 29-33, another locking mechanism 322 is provided that could be incorporated into a seat-track assembly 310. The structure and function of the seat-track assembly 310 and the locking mechanism 322 may be similar or identical to that of the seat-track assembly 110 and the locking mechanism 122 described above, apart from any exceptions described below and/or shown in the figures. Therefore, similar features and functions will not be described again in detail.

The seat-track assembly 310 may include lower and upper tracks 318, 320, which may be similar or identical to the lower and upper tracks 118, 120 described above. Like the locking mechanism 122, the locking mechanism 322 may include a series of locking pawls 346, a series of biasing members 348, a mounting bracket or housing 350, and an actuator 368.

The mounting bracket 350 may include a body 351 defining a cavity 353, a pair of mounting apertures 355 and tabs 367. The cavity 353 may include a plurality of pockets 358 (similar to pockets 158) that are in communication with each other (via slots 359) and extend axially through the body 351. The tabs 367 may extend from a top wall 362 and may extend through apertures 369 in the upper track 320. As described above, the locking mechanism 322 can be preassembled as a cartridge or module by fastening the mounting bracket 350 to the upper track 320 with threaded fasteners 366.

In the configuration shown in FIGS. 29-33, the locking mechanism 322 has three locking pawls 346 that are movable independently of each other. Each of the locking pawls 346 may include a main body 352, a pair of locking arms 354 (locking elements), and an actuation arm 356. Distal ends of the actuation arms 356 may be pressed into (or otherwise fixed within) respective apertures formed in the main bodies 352. In some configurations, the main body 352, locking arm 354 and actuation arm 356 could be integrally formed as a unitary body. Each main body 352 may have a single locking arm 354 extending from each opposite end of the main body 342.

The biasing members 348 may be coil springs that surround a portion of the actuation arms 356 and are received within the pockets 358 of the mounting bracket 350. The biasing members 348 are retained within the pockets 358 to allow the biasing members 348 to exert forces on the locking pawls 346 (via each actuation arm 356) to bias the locking pawls 346 upward toward a locked state.

The actuator 368 may include an elongated bar 370 and a peg 371. The elongated bar 370 may be disposed within the cavity 353 of the mounting bracket 350 and may be movable therein to force the locking pawls 346 from the locked state (i.e., the upward position) toward the unlocked state (i.e., the downward position). The elongated bar 370 may be elongated in a direction parallel to a longitudinal axes of the tracks 318, 320 (i.e., the direction in which the upper track 320 is movable relative to the lower track 318). The peg 371 may extend from the elongated bar 370 in a direction perpendicular to the longitudinal axes of the tracks 318, 320 and may protrude through an aperture 373 in the upper track 320.

As shown in FIGS. 31-33, the lower track 318 includes a plurality of locking features 332 (similar to locking features 132) that are separated by protrusions 334. The locking features 332 may be slots that each have a width W1 that is at least two times larger than a width W2 of each locking arm 354. A width W3 of the protrusions 334 between adjacent locking features 332 may be about two times larger than the width W1, for example. In some configurations, the width W3 may be less than twice the width W1. The size of the locking arms 354 and spacing between the locking arms 354 as well as the size of the locking features 332 and spacing between the locking features 332 is such that when the upper track 320 is fixed in both directions (forward and rearward) relative to the lower track 318, the locking arms 354 of a first one of the locking pawls 346 will be contacting a forward end face 381 of one of the locking features 332, the locking arms 354 of a second one of the locking pawls 346 will be contacting a rearward end face 383 of another one of the locking features 332, and the locking arms 354 of a third one of the locking pawls 346 will not be received in any of the locking features 332. The locking mechanism 322 is a positive engagement latch (PEL) mechanism. That is, at least one of the pawls 346 will be received in the locking features 332 in the lower track 318 upon release of the actuator 368 regardless of the position of the upper track 320 relative to the lower track 318. A second one of the locking pawls 346 will engage another locking feature 332 in response to movement of the upper track 320 over a distance (in either direction) of no more than half of the locking increment (i.e., half of the distance between adjacent locked positions of the upper track 320).

Referring now to FIGS. 34-38, another locking mechanism 422 is provided that could be incorporated into a seat-track assembly 410. The structure and function of the seat-track assembly 410 and the locking mechanism 422 may be similar or identical to that of the seat-track assembly 310 and the locking mechanism 322 described above, apart from any exceptions described below and/or shown in the figures. Therefore, similar features and functions will not be described again in detail.

The seat-track assembly 410 may include lower and upper tracks 418, 420, which may be similar or identical to the lower and upper tracks 318, 320 described above. Like the locking mechanism 322, the locking mechanism 422 may include a series of locking pawls 446, a series of biasing members 448, a mounting bracket or housing 450, and an actuator 468.

The mounting bracket 450 may include a body 451 defining a cavity 453, a pair of mounting apertures 455 and tabs 467. The cavity 453 may include a plurality of pockets 458 that are in communication with each other and extend axially through the body 451. The tabs 467 may extend from a top wall 462 and may extend through apertures 469 in the upper track 420. As described above, the locking mechanism 422 can be preassembled as a cartridge or module by fastening the mounting bracket 450 to the upper track 420 with threaded fasteners 466.

In the configuration shown in FIGS. 34-38, the locking mechanism 422 has three locking pawls 446 that are movable independently of each other. Each of the locking pawls 446 may include a main body 452, a plurality of locking arms 454 (locking elements), and an actuation arm 456. Distal ends of the actuation arms 456 may be pressed into (or otherwise fixed within) respective apertures formed in the main bodies 452. In some configurations, the main body 452, locking arm 454 and actuation arm 456 could be integrally formed as a unitary body. In the configuration shown, the main body 452 has a pair of locking arm 454 extending from each opposite end of the main body 442.

The biasing members 448 may be coil springs that surround a portion of the actuation arms 456 and are received within the pockets 458 of the mounting bracket 450. The biasing members 448 are retained within the pockets 458 to allow the biasing members 448 to exert forces on the locking pawls 446 (via each actuation arm 456) to bias the locking pawls 446 upward toward a locked state.

The actuator 468 may include an elongated bar 470 and a peg 471. The elongated bar 470 may be disposed within the cavity 453 of the mounting bracket 450 and may be movable therein to force the locking pawls 446 from the locked state (i.e., the upward position) toward the unlocked state (i.e., the downward position). The elongated bar 470 may be elongated in a direction parallel to a longitudinal axes of the tracks 418, 420. The peg 471 may extend from the elongated bar 470 in a direction perpendicular to the longitudinal axes of the tracks 418, 420 and may protrude through an aperture 473 in the upper track 420.

As shown in FIGS. 36-38, the lower track 418 includes a plurality of locking features 432 (similar to locking features 332) that are separated by protrusions 434. The locking features 432 may be slots that each have a width W1 that is at least two times larger than a width W2 of each locking arm 454. A width W3 of the protrusions 434 between adjacent locking features 432 may be about two times larger than the width W1, for example. In some configurations, the width W3 may be less than twice the width W1. The size of the locking arms 454 and spacing between the locking arms 454 as well as the size of the locking features 432 and spacing between the locking features 432 is such that when the upper track 420 is fixed in both directions (forward and rearward) relative to the lower track 418, the locking arms 454 of a first one of the locking pawls 446 will be contacting a forward end face 481 of one of the locking features 432, the locking arms 454 of a second one of the locking pawls 446 will be contacting a rearward end face 483 of another one of the locking features 432, and the locking arms 454 of a third one of the locking pawls 446 will not be received in any of the locking features 432. In some configurations, the forward and rearward end faces 481, 483 may be tapered.

The locking arms 454 that are in contact with the forward end faces 481 can absorb a crash load associated with a front-impact event of the vehicle in which the seat-track assembly 410 is installed. The locking arms 454 that are in contact with the rearward end faces 483 can absorb a crash load associated with a rear-impact event of the vehicle.

The locking mechanism 422 is a positive engagement latch (PEL) mechanism. That is, at least one of the pawls 446 will be received in the locking features 432 in the lower track 418 upon release of the actuator 468 regardless of the position of the upper track 420 relative to the lower track 418. A second one of the locking pawls 446 will engage another locking feature 432 in response to movement of the upper track 420 over a distance (in either direction) of no more than half of the locking increment (i.e., half of the distance between adjacent locked positions of the upper track 420).

Figure 40:
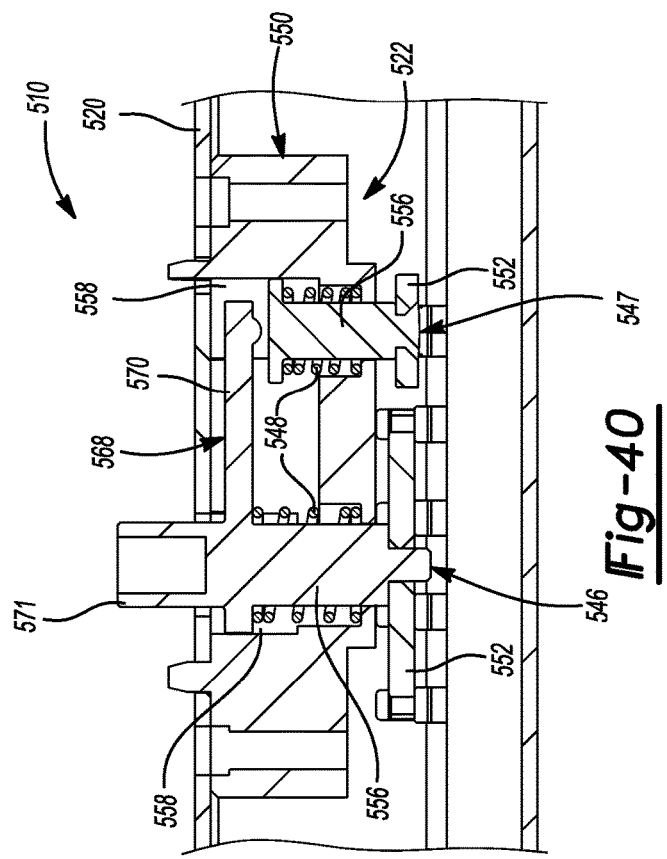
FIG. 40 is a partial cross-sectional view of the locking mechanism of FIG. 39 installed in a seat-track assembly.
Figure 39:
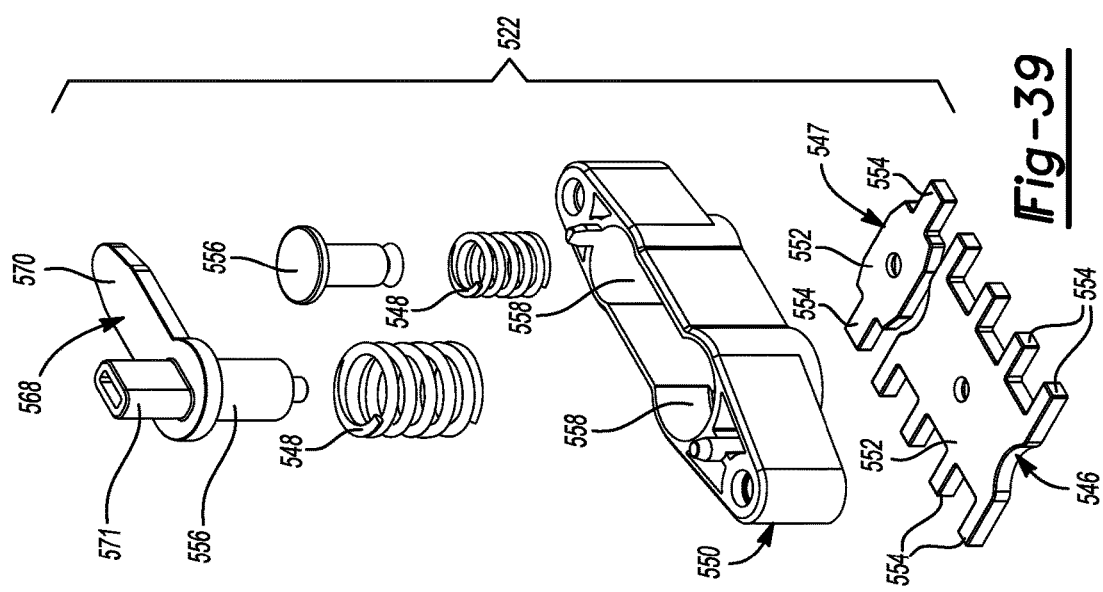
FIG. 39 is an exploded perspective view of a locking mechanism in accordance with the principles of the present disclosure.
Figure 43:
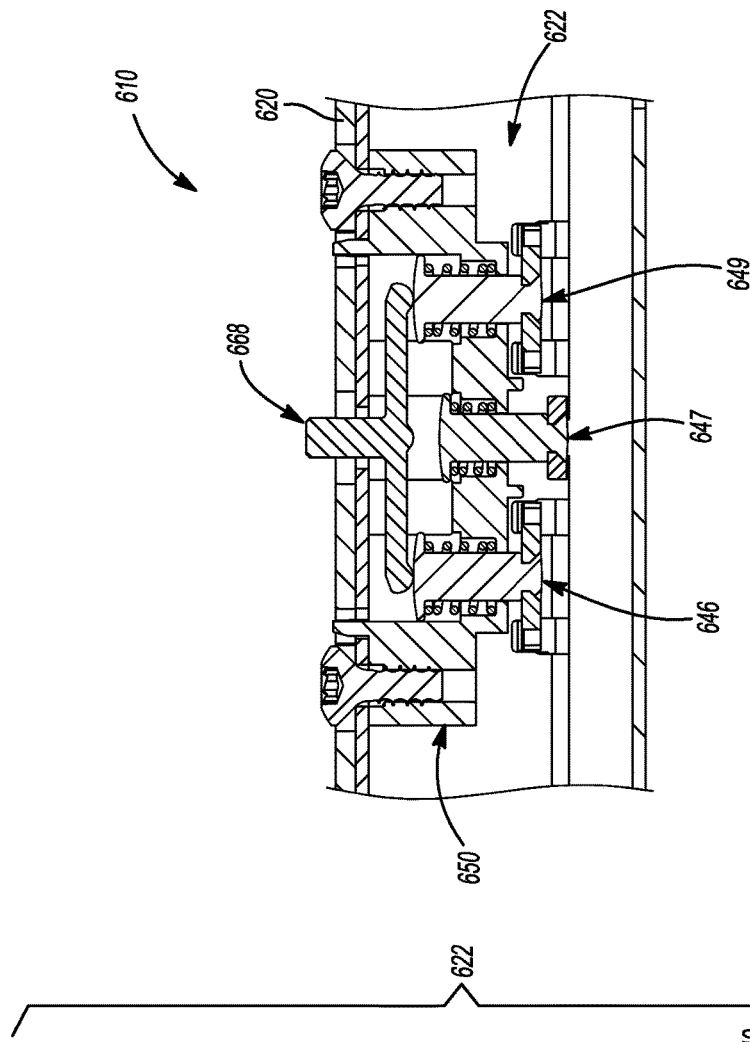
FIG. 43 is a partial cross-sectional view of the locking mechanism of FIG. 42 installed in a seat-track assembly.
Figure 42:
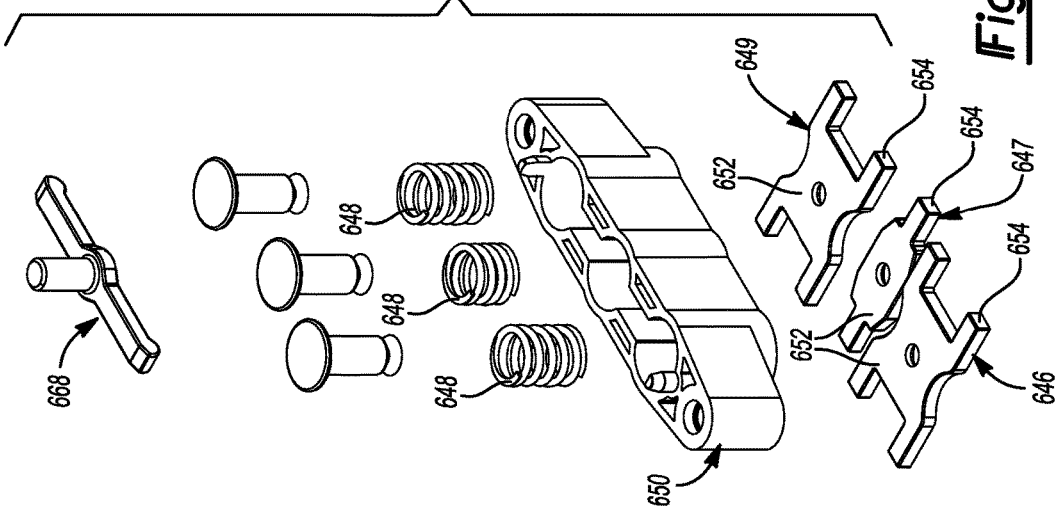
FIG. 42 is an exploded perspective view of a locking mechanism in accordance with the principles of the present disclosure.

Referring now to FIGS. 39-41, another locking mechanism 522 is provided that could be incorporated into a seat-track assembly 510. The structure and function of the seat-track assembly 510 and the locking mechanism 522 may be similar or identical to that of the seat-track assembly 310 and the locking mechanism 322 described above, apart from any exceptions described below and/or shown in the figures. Therefore, similar features and functions will not be described again in detail.

The seat-track assembly 510 may include lower and upper tracks 518, 520, which may be similar or identical to the lower and upper tracks 118, 120 described above. The locking mechanism 522 may include a first locking pawl 546, a second locking pawl 547, a plurality of biasing members 548, and a mounting bracket or housing 550. The mounting bracket 550 may be generally similar to the mounting brackets 350, 450.

The first and second locking pawls 546, 547 may each include a main body 552, a plurality of locking arms 554 (locking elements), and an actuation arm 556. Distal ends of the actuation arms 556 may be pressed into (or otherwise fixed within) respective apertures formed in the main bodies 552. In some configurations, the main body 552, locking arm 554 and actuation arm 556 could be integrally formed as a unitary body. The main body 352 of the first locking pawl 546 may have a plurality of locking arms 554 extending from each opposite end of the main body 542. The main body 552 of the second locking pawl 547 may have a single locking arm 554 extending from each opposite end of the main body 542.

The biasing members 348 may be coil springs that surround a portion of the actuation arms 556 and are received within pockets 558 in the mounting bracket 550. The biasing members 548 are retained within the pockets 558 to allow the biasing members 548 to exert forces on the locking pawls 546, 547 (via each actuation arms 556) to bias the locking pawls 546, 547 upward toward a locked state.

The actuation arm 556 of the first locking pawl 546 may have an actuator 568 integrally formed therewith or fixedly attached thereto. The actuator 568 may include an elongated bar 570 that extends parallel to longitudinal axes of the tracks 518, 520. A peg 571 may extend upward from the elongated bar 570 in a direction perpendicular to the longitudinal axes of the tracks 518, 520. As described above, the peg 571 may extend through an aperture in the upper track 520. When the actuator 568 is moved downward (relative to the position shown in FIG. 40), both locking pawls 546, 547 can be simultaneously forced downward into the unlocked state.

As shown in FIG. 41, the locking arms 554 of the first locking pawl 546 each have a first width W1 that is smaller than a second width W2 of each of the locking arms 554 of the second locking pawl 547. As described above, the locking arms 554 of the locking pawls 546, 547 can be received in locking features (e.g., slots) 532 formed in the lower track 518. Forward and rearward end faces 581, 583 of the locking features 532 may include tapered portions that are angled toward each other so that the width of the locking feature 532 decreases with the distance from the opening of the locking feature 532 increases.

The narrowest portion of each locking feature 532 may still be wider than the first width W1 of the locking arms 554 of the first locking pawl 546. The width of the narrowest portion of each locking feature 532 may be equal to or less than the second width W2 of the locking arms 554 of the second locking pawl 547. In this manner, the locking arm 554 of the second locking pawl 547 will simultaneously contact both of the forward and rearward end faces 581, 583 of the locking feature 532 in which it is received. This simultaneous contact with the forward and rearward end faces 581, 583 will eliminate any "slop" or "free-play" between the lower and upper tracks 518, 520 when the locking mechanism 522 is in the locked state. When received in corresponding locking features 532, the locking arms 554 of the first locking pawl 546 are able to absorb a large amount of energy associated with a crash event or sudden, extreme deceleration of the vehicle in which the seat-track assembly 510 is installed.

Referring now to FIGS. 42-46, another locking mechanism 622 is provided that could be incorporated into a seat-track assembly 610. The structure and function of the seat-track assembly 610 and the locking mechanism 622 may be similar or identical to that of the seat-track assembly 410 and the locking mechanism 422 described above, apart from any exceptions described below and/or shown in the figures. Therefore, similar features and functions will not be described again in detail.

The seat-track assembly 610 may include lower and upper tracks 618, 620, which may be similar or identical to the lower and upper tracks 418, 420 described above. The locking mechanism 622 may include a first locking pawl 646, a second locking pawl 647, a third locking pawl 649, a series of biasing members 648, a mounting bracket 650, and an actuator 668. The biasing members 648, mounting bracket 650 and actuator 668 may be similar or identical to the biasing members 448, mounting bracket 450 and actuator 468 described above. Furthermore, the first and third locking pawls 646, 649 may be similar or identical to the locking pawls 446 described above.

Like the locking pawls 446, the first and third locking pawls 646, 649 may each have a pair of locking arms 654 on both ends of the main body 652 of each locking pawl 646, 649 (i.e., each locking pawl 646, 649 may have a total of four locking arms 654). The second locking pawl 647 may have only a single locking arm 654 on each end of the main body 652 (i.e., a total of two locking arms 654 on the second locking pawl 647).

In the position shown in FIG. 44, the first and third locking pawls 646, 649 are in the locked state (i.e., locking elements 654 of the first and third locking pawls 646, 649 are engaged with (e.g., received within) a respective one of a series of locking features 632 of the lower track 618) and the second locking pawl 647 is in the unlocked state. During a front-impact event, the first locking pawl 646 may absorb a large amount of energy and keep the upper track 620 stationary relative to the lower track 618. During a rear-impact event, the third locking pawl 649 may absorb a large amount of energy and keep the upper track 620 stationary relative to the lower track 618.

In the position shown in FIG. 45, the second and third locking pawls 647, 649 are in the locked state (i.e., locking elements 654 of the second and third locking pawls 647, 649 are engaged with (e.g., received within) a respective one of the series of locking features 632 of the lower track 618) and the first locking pawl 646 is in the unlocked state. During a front-impact event, the third locking pawl 649 may absorb a large amount of energy and keep the upper track 620 stationary relative to the lower track 618. During a rear-impact event, the second locking pawl 647 may bend while absorbing crash energy and allow the upper track 620 to move rearward relative to the lower track 618 only until the first locking pawl 646 is able to move into the locked state. Thereafter, the first locking pawl 646 will absorb any remaining crash energy and keep the upper track 620 stationary relative to the lower track 618.

In the position shown in FIG. 46, the first and second locking pawls 646, 647 are in the locked state (i.e., locking elements 654 of the first and second locking pawls 646, 647 are engaged with (e.g., received within) a respective one of the series of locking features 632 of the lower track 618) and the third locking pawl 649 is in the unlocked state. During a rear-impact event, the first locking pawl 646 may absorb a large amount of energy and keep the upper track 620 stationary relative to the lower track 618. During a front-impact event, the second locking pawl 647 may bend while absorbing crash energy and allow the upper track 620 to move forward relative to the lower track 618 only until the third locking pawl 649 is able to move into the locked state. Thereafter, the third locking pawl 649 will absorb any remaining crash energy and keep the upper track 620 stationary relative to the lower track 618.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seat-track assembly comprising:
a first track member having locking features;
a second track member slidably supported by the first track member; and
a locking mechanism disposed at least partially between the first track member and the second track member and including a first locking pawl, a second locking pawl and a third locking pawl, each of the first, second and third locking pawls being independently movable between a locked state and an unlocked state, wherein:
the first, second and third locking pawls each include a main body and a plurality of locking elements extending from the main body, the plurality of locking elements of each of the first, second and third locking pawls are engaged with selected ones of the locking features in the locked state,
the plurality of locking elements of each of the first, second and third locking pawls are disengaged from the locking features in the unlocked state,
relative movement between the first track member and the second track member is restricted when two of the first, second and third locking pawls are in the locked state,
the first track member and the second track member are allowed to move relative to each other when all three of the first, second and third locking pawls are in the unlocked state,
the locking features each have a width that is at least double a width of each of the plurality of locking elements of each of the first, second and third locking pawls such that the plurality locking elements of each of the two of the first, second and third locking pawls simultaneously restrict relative movement between the first track member and the second track member in two directions when the two of the first, second and third locking pawls are in the locked state, at least one of the first, second and third locking pawls is in the unlocked state at any given time, the plurality of locking elements of the first locking pawl include at least two locking elements extending from a first end of the main body of the first locking pawl and at least two locking elements extending from a second end of the main body of the first locking pawl, the plurality of locking elements of the second locking pawl include one locking element extending from a first end of the main body of the second locking pawl and one locking element extending from a second end of the main body of the second locking pawl, the plurality of locking elements of the third locking pawl include at least two locking elements extending from a first end of the main body of the third locking pawl and at least two locking elements extending from a second end of the main body of the third locking pawl;

an actuator operable to selectively apply a force on any two of the first, second and third locking pawls to maintain the any two of the first, second and third locking pawls in the unlocked state, the actuator includes an elongated bar extending parallel to longitudinal axes of the first and second track members, the actuator further includes a peg extending perpendicular to the longitudinal axes and through an aperture in the second track member; and a housing attached to the second track member and disposed between the first and second track members, the housing defining a cavity having a plurality of pockets, the plurality of pockets extending axially through the housing, wherein each of the first, second and third locking pawls includes an actuation arm that extends at least partially into a respective pocket of the plurality of pockets and reciprocates therein as each of the first, second and third locking pawls moves between the locked state and the unlocked state.

2. The seat-track assembly of claim 1, wherein at least one of the first, second and third locking pawls is in the locked state following release of the force regardless of the positioning of the second track member relative to the first track member.

3. The seat-track assembly of claim 2, wherein relative movement between the first track member and the second track member is limited to half of the width of one of the locking features following release of the force before the plurality of locking elements of each of the two of the first, second and third locking pawls are engaged with the selected ones of the locking features.

4. The seat-track assembly of claim 3, wherein the elongated bar is configured to selectively apply a force on the any two of the first, second and third locking pawls to maintain the any two of the first, second and third locking pawls in the unlocked state.

5. A seat-track assembly comprising:
a first track member having locking features;
a second track member slidably supported by the first track member;
a locking mechanism disposed at least partially between the first track member and the second track member and including a first locking pawl and a second locking pawl, each of the first and second locking pawls being independently movable between a locked state and an unlocked state, wherein:

the first and second locking pawls each include a main body and a plurality of locking elements extending from the main body, the plurality of locking elements of each of the first and second locking pawls are engaged with selected ones of the locking features in the locked state, the plurality of locking elements of each of the first and second locking pawls are disengaged from the locking features in the unlocked state, relative movement between the first track member and the second track member is restricted when the first locking pawl is in the locked state, the first track member and the second track member are allowed to move relative to each other when the first and second locking pawls are in the unlocked state, the locking features each have a width that is at least double a width of each of the plurality of locking elements of each of the first and second locking pawls such that the plurality of locking elements of the first locking pawl restrict relative movement between the first track member and the second track member in one direction when the first locking pawl is in the locked state, the plurality of locking elements of the first locking pawl include at least two locking elements extending from a first end of the main body of the first locking pawl and at least two locking elements extending from a second end of the main body of the first locking pawl, the plurality of locking elements of the second locking pawl include one locking element extending from a first end of the main body of the second locking pawl and one locking element extending from a second end of the main body of the second locking pawl, an actuator operable to selectively apply a force on the first and second locking pawls to maintain the first and second locking pawls in the unlocked state, the actuator includes an elongated bar extending parallel to longitudinal axes of the first and second track members, the actuator further includes a peg extending perpendicular to the longitudinal axes and through an aperture in the second track member; and a housing attached to the second track member and disposed between the first and second track members, the housing defining a cavity having a plurality of pockets, the plurality of pockets extending axially through the housing, wherein each of the first and second locking pawls includes an actuation arm that extends at least partially into a respective pocket of the plurality of pockets and reciprocates therein as each of the first and second locking pawls moves between the locked state and the unlocked state.

6. The seat-track assembly of claim 5, further comprising a third locking pawl movable independently of the first and second locking pawls between a locked state and an unlocked state.

7. The seat-track assembly of claim 6, wherein the second locking pawl is disposed between the first and third locking pawls, and wherein the third locking pawl includes at least two locking elements extending from a first end of a main body of the third locking pawl and at least two elements extending from a second end of the main body of the third locking pawl.

8. The seat-track assembly of claim 7, wherein at least one of the first, second and third locking pawls is in the locked state following release of the force regardless of the positioning of the second track member relative to the first track member.

9. The seat-track assembly of claim 8, wherein relative movement between the first track member and the second track member is limited to half of the width of one of the locking features following release of the force before the plurality of locking elements of two of the first, second and third locking pawls are engaged with the selected ones of the locking features.

10. The seat-track assembly of claim 5, wherein the first track member and the second track member are movable in two, opposite directions relative to one another along an axis when the first and second locking pawls are in the unlocked state.

\* \* \* \* \*

UNITED STATES PATENT AND TRADEMARK OFFICE
CERTIFICATE OF CORRECTION

PATENT NO. : 10,266,074 B2
APPLICATION NO. : 14/886392
DATED : April 23, 2019
INVENTOR(S) : David G. Anticuar et al.

Page 1 of 1

It is certified that error appears in the above-identified patent and that said Letters Patent is hereby corrected as shown below:

In the Specification

At Column 15, Line number 62, delete "146" and insert --154--.

At Column 18, Line number 53, delete "rack" and insert --track--.

Signed and Sealed this
Second Day of July, 2019

Andrei Iancu
*Director of the United States Patent and Trademark Office*